US007577618B2

(12) United States Patent
Raju et al.

(10) Patent No.: US 7,577,618 B2
(45) Date of Patent: Aug. 18, 2009

(54) GENERIC VALUE BEARING ITEM LABELS

(75) Inventors: Lawrence N. Raju, North HIlls, CA (US); Yvonne K. Hansen, Santa Monica, CA (US); Craig L. Ogg, Long Beach, CA (US)

(73) Assignee: Stamps.com Inc., Los Angeles, CA (US)

( * ) Notice: Subject to any disclaimer, the term of this patent is extended or adjusted under 35 U.S.C. 154(b) by 761 days.

(21) Appl. No.: 10/197,044

(22) Filed: Jul. 16, 2002

(65) Prior Publication Data

US 2003/0037008 A1 Feb. 20, 2003

Related U.S. Application Data

(63) Continuation-in-part of application No. 09/975,532, filed on Oct. 10, 2001, now Pat. No. 7,191,158.

(60) Provisional application No. 60/239,424, filed on Oct. 10, 2000.

(51) Int. Cl.
*G06F 17/60* (2006.01)

(52) U.S. Cl. .......................................... 705/60; 705/62

(58) Field of Classification Search ................... 705/60, 705/1, 62, 408; 283/80–82
See application file for complete search history.

(56) References Cited

U.S. PATENT DOCUMENTS 4,780,828 A 10/1988 Whisker (Continued)

FOREIGN PATENT DOCUMENTS

GB 2235413 A 3/1991

(Continued)

OTHER PUBLICATIONS

United States Patent Office; Office Action dated Dec. 14, 2004 for Craig L. Ogg et al; Systems and Method for Providing Computer-Based Postage Stamps; U.S. Appl. No. 09/975,532, filed Oct. 10, 2001; Now, U.S. Patent No. 7,191,158; Issued Mar. 13, 2007.

(Continued)

*Primary Examiner*—Pierre E Elisca

(74) *Attorney, Agent, or Firm*—Khorsandi Patent Law Group, A Law Corporation; Marilyn R. Khorsandi

(57) ABSTRACT

The present invention provides an intuitively-based (WYSIWYG) user interface for generic value bearing item label custom specification of each label on a multi-part label set. According to the present invention, an interactive display such as is depicted in FIG. 13 would be provided on a display monitor of a plurality of independently interactive panels, wherein each panel corresponds to a particular label on a multi-part label set. As depicted in FIG. 13, the exemplary WYSIWYG generic custom VBI label specification interface of the present invention displays an interactive label display (1110) in which each separate label panel (e.g., 1120-11 through 1120-45) displays an independent postage rate class input field (e.g., 1125-11 with a postage rate class menu button, e.g., 1123-11). Once the user has selected the "Custom" option (1150), the user can set the price for each label by clicking on the individual rate input field (e.g., 1121-11) of the particular label panel (e.g., 1120-11), and inputting any amount, e.g., $0.37 (e.g., 1122-11); and then clicking on the corresponding postage rate class menu button (e.g., 1123-11) and selecting a postage rate class (e.g., 1125-11).

10 Claims, 16 Drawing Sheets

U.S. PATENT DOCUMENTS

| | | | | | |
|---|---|---|---|---|---|
| 4,872,706 | A | * | 10/1989 | Brewen et al. | 283/81 |
| 5,122,967 | A | | 6/1992 | Gilham | |
| 5,408,416 | A | | 4/1995 | Gilham | |
| 5,491,495 | A | | 2/1996 | Ward et al. | |
| 5,573,277 | A | | 11/1996 | Petkovsek | 283/79 |
| 5,626,286 | A | | 5/1997 | Petkovsek | 229/300 |
| 5,717,597 | A | | 2/1998 | Kara | |
| 5,737,729 | A | | 4/1998 | Denman | |
| 5,801,944 | A | | 9/1998 | Kara | |
| 5,812,991 | A | | 9/1998 | Kara | |
| 5,848,401 | A | | 12/1998 | Goldberg et al. | 705/408 |
| 5,923,406 | A | | 7/1999 | Brasington et al. | |
| 5,995,985 | A | * | 11/1999 | Cai | 715/201 |
| 6,010,156 | A | * | 1/2000 | Block | 281/2 |
| 6,108,643 | A | | 8/2000 | Sansone | |
| 6,192,165 | B1 | | 2/2001 | Irons | |
| 6,208,980 | B1 | | 3/2001 | Kara | |
| 6,209,920 | B1 | * | 4/2001 | Fabel | 283/62 |
| 6,244,763 | B1 | | 6/2001 | Miller | |
| 6,296,404 | B1 | | 10/2001 | Pierce et al. | 400/62 |
| 6,311,214 | B1 | | 10/2001 | Rhoads | |
| 6,415,983 | B1 | | 7/2002 | Ulvr et al. | |
| 6,424,954 | B1 | * | 7/2002 | Leon | 705/401 |
| 6,427,021 | B1 | | 7/2002 | Fischer et al. | |
| 6,461,063 | B1 | * | 10/2002 | Miller et al. | 400/76 |
| 6,505,179 | B1 | | 1/2003 | Kara | 705/50 |
| 6,505,980 | B1 | | 1/2003 | Allday | |
| 6,592,027 | B2 | | 7/2003 | Kovlakas | |
| 6,594,374 | B1 | | 7/2003 | Beckstrom et al. | |
| 6,655,579 | B1 | | 12/2003 | Delman et al. | |
| 6,687,684 | B1 | | 2/2004 | Whitehouse | |
| 6,701,304 | B2 | | 3/2004 | Leon | |
| 6,722,563 | B1 | | 4/2004 | Johnson et al. | |
| 6,735,575 | B1 | | 5/2004 | Kara | |
| 7,085,725 | B1 | * | 8/2006 | Leon | 705/1 |
| 7,149,726 | B1 | | 12/2006 | Lingle et al. | |
| 7,162,460 | B2 | | 1/2007 | Cleckler et al. | |
| 7,191,158 | B2 | | 3/2007 | Ogg et al. | |
| 7,194,957 | B1 | | 3/2007 | Leon et al. | |
| 7,243,842 | B1 | | 7/2007 | Leon et al. | |
| 2001/0042052 | A1 | | 11/2001 | Leon | |
| 2002/0023057 | A1 | | 2/2002 | Goodwin et al. | |
| 2002/0033598 | A1 | | 3/2002 | Beasley | |
| 2002/0046195 | A1 | | 4/2002 | Martin et al. | |
| 2002/0083020 | A1 | | 6/2002 | Leon | |
| 2003/0101143 | A1 | | 5/2003 | Montgomery et al. | |
| 2003/0101148 | A1 | | 5/2003 | Montgomery et al. | |
| 2003/0140017 | A1 | | 7/2003 | Patton et al. | |
| 2003/0217017 | A1 | | 11/2003 | Willoughby et al. | |
| 2004/0215523 | A1 | | 10/2004 | Wulff et al. | |
| 2005/0125367 | A1 | | 6/2005 | Ogg et al. | |
| 2005/0144145 | A1 | | 6/2005 | Ogg et al. | |
| 2005/0195214 | A1 | | 9/2005 | Reid et al. | |
| 2007/0100672 | A1 | | 5/2007 | McBrida et al. | |

FOREIGN PATENT DOCUMENTS

| | | | |
|---|---|---|---|
| JP | 408230257 | * | 9/1996 |
| WO | WO 00/49580 | | 8/2000 |

OTHER PUBLICATIONS

United States Patent Office; Notice of Allowance dated May 16, 2005 for Craig L. Ogg et al; Systems and Method for Providing Computer-Based Postage Stamps; U.S. Appl. No. 09/975,532, filed Oct. 10, 2001; Now, U.S. Patent No. 7,191,158; Issued Mar. 13, 2007.

Notice of Withdrawl From Issue, United States Patent Office, dated Nov. 30, 2005 for Craig L. Ogg et al; Systems and Method for Providing Computer-Based Postage Stamps; U.S. Appl. No. 09/975,532, filed Oct. 10, 2001; Now, U.S. Patent No. 7,191,158; Issued Mar. 13, 2007.

United States Patent Office; Office Action dated Apr. 12, 2006 for Craig L. Ogg et al; Systems and Method for Providing Computer-Based Postage Stamps; U.S. Appl. No. 09/975,532, filed Oct. 10, 2001; Now, U.S. Patent No. 7,191,158; Issued Mar. 13, 2007.

United States Patent Office; Notice of Allowance dated Sep. 6, 2006 for Craig L. Ogg et al; Systems and Method for Providing Computer-Based Postage Stamps; U.S. Appl. No. 09/975,532, filed Oct. 10, 2001; Now, U.S. Patent No. 7,191,158; Issued Mar. 13, 2007.

"Multicolor Easily Printable Bar Code", IBM Tech. Discl. Bull., vol. 14. No. 3, p. 783 (Aug. 1971).

Examiner Rutao Wu, United States Patent Office; Office Action dated Apr. 16, 2007 for Ogg et al; Computer Postage and Mail Tracking Labels; U.S. Appl. No. 10/731,992; filed Dec. 8, 2003.

Examiner Rutao Wu, United States Patent Office; Office Action dated Nov. 1, 2007 for Ogg et al; Computer Postage And Mail Tracking Labels; U.S. Appl. No. 10/731,992; filed Dec. 8, 2003.

Examiner Rutao Wu, United States Patent Office; Office Action dated May 28, 2008 for Ogg et al; Computer Postage And Mail Tracking Labels; U.S. Appl. No. 10/731,992; filed Dec. 8, 2003.

Examiner Pierre E. Elisca, United States Patent Office; Notice of Allowance dated Sep. 5, 2006 for Cleckler et al; Media Type Identification; U.S. Appl. No. 10/688,548; filed Dec. 8, 2003.

Examiner Thien Minh Le, United States Patent Office; Notice of Allowance dated Jan. 5, 2007 for Huebner et al; Computer-Based Value-Bearing Item Customization Security; U.S. Appl. No. 10/994,768; filed Nov. 22, 2004.

Examiner Pierre E. Elisca, United States Patent Office; Notice of Allowance dated Jul. 15, 2008 for Mc Bride et al; Formatting Value-Bearing Item Indicia; U.S. Appl. No. 11/635,871; filed Dec. 8, 2006.

Stamps.com Inc., Santa Monica, CA 90405, Stamps.com 3-part Multi-Purpose Labels SDC-3100, 1 Page.

Stamps.com Inc., Santa Monica, CA 90405, Stamps.com 2-part Window Envelope Labels SDC-2300, 1 Page.

Canada Post Corporation; "Collecting - Picture Postage", 3 pages, © 2004, http://www.canadapost.ca/personal/collecting/default-e.asp?stamp=postage.

Personal Postage Corporation; "Personal Postage", 1-page, Undated, http://www.personalpostage.com, Printed Jul. 20, 2004.

Personal Postage Corporation; "Personal Postage", 2 pages, Undated, http://www.personalpostage.com/home.htm, printed Jul. 20, 2004.

Canada Post International, LLC; "Personal-Postage", 2 pages, Undated, http://www.personalpostage.com/Canada%20Post.htm, pnnted Jul. 20, 2004.

Personal Postage Corporation; "Quick Reference Guide"; 8 pages; Undated; http://www.personalpostage.com/Om_page1.htm, page2.htm, page3.htm, page4.htm, printed Jul. 20, 2004.

Avery Dennison Corporation; "Avery Creative Postage Labels", 4 pages, http://www.creativepostagelabels.avery.com/postage_aap.html; © 1996-2004.

Avery Dennison Corporation; "Avery Creative Postage Labels", 2 pages, http://www.creativepostagelabels.avery.com/order.php; © 1996-2004.

Canadian Post; picture stamp sample, undated, prior to Jul. 27, 2004, 1 page.

Canadian Post; Set of pictures and address labels; sample, undated, prior to Jul. 27, 2004, 1 page.

"It's in the mail: a personalized postcode for life", an article about Royal Mail picture stamps, date unknown (prior to Jul. 27, 2004), publication unknown, 1 page.

Australian Post sample; Jul. 7-16, 2000; Anaheim, CA, 1 page.

* cited by examiner

GENERIC VALUE BEARING ITEM LABELS

CROSS REFERENCE TO RELATED APPLICATIONS

This application is a continuation-in-part of U.S. patent application Ser. No. 09/975,532, filed Oct. 10,2001 now U.S. Pat. No. 7,191,158, entitled "SYSTEM AND METHOD FOR PROVIDING COMPUTER-BASED POSTAGE STAMPS" which claims the benefit of U.S. Provisional Application No. 60/239,424 filed Oct.10, 2000, entitled "A SYSTEM AND METHOD FOR PROVIDING COMPUTER BASED POSTAGE STAMPS" the entire contents and disclosures of which are hereby incorporated by reference for all purposes as if fully set forth herein.

The entire contents and disclosures of co-pending U.S. patent application Ser. No. 09/905,329, filed Jul. 13, 2001, entitled "WEB-ENABLED VALUE BEARING ITEM PRINTING" and co-pending U.S. patent application Ser. No. 09/585,025, filed Jun. 1, 2000 and entitled "ON-LINE VALUE BEARING ITEM PRINTING" are hereby expressly incorporated by reference for all purposes as if fully set forth herein.

BACKGROUND

Value Bearing Items ("VBI") include among other things, postage, coupons, tickets, gift certificates, currency, money orders, vouchers and the like. U.S. patent application Ser. No. 09/975,532 entitled "SYSTEM AND METHOD FOR PROVIDING COMPUTER-BASED POSTAGE STAMPS" (hereinafer referred to as the "Generic VBI Invention"), the contents and disclosures of which have previously been incorporated in full herein, discloses systems and methods for the creation of generic VBI postage, such that no intended recipient address need be specified, verified or indicated in any way on the created postage. The systems and methods disclosed in the Generic VBI Invention provided for the generation and printing of generic VBI, such as postage, that may be used at any time for any recipient, much like pre-printed postage printed and sold by the U.S. Postal Service ("USPS"). The term generic postage as used herein refers to postage that is non-recipient specific and/or non-date specific.

The Generic VBI Invention disclosed a user interface via which a user could enter postage specifications, such as a mail class and an amount; the user could specify a starting location and a number of labels on a multi-part label set. Herein, reference to a label set includes single-feed sheet labels and label rolls. The user interface disclosed in the Generic Postage Application did not provide for user-varied postage specifications for individual labels on a multi-part label set. If a user wanted to print different postage amounts or specify different mail classes on various labels on a multi-part label set, the user would need to print each set of specifications separately, each time, re-feeding the multi-part label set through the user's printer.

The Generic VBI Invention disclosed the generation and printing of a horizontally-oriented generic postage stamp such that a machine-readable two-dimensional ("2-D") barcode is printed side-by-side with visually-readable postage indicia. When a mailpiece is mailed, the USPS "cancels" the stamps applied to the mailpiece—that is, the USPS applies an ink-bearing stamp, or other stamp, across the postage stamp to indicate the date of postage and to further indicate that the postage stamp has been used and cannot be used again. USPS cancellation of the horizontally-oriented postage stamp often results in the ink-bearing, or other type, cancellation stamp over-writing the machine-readable 2-D barcode. Such over-writing can obscure the machine-readable 2-D barcode or render the machine-readable 2-D barcode inaccurate or unreadable.

SUMMARY OF THE INVENTION

The present invention provides an intuitively-based (WYSIWYG) user interface for generic VBI, custom specification of each VBI label on a multi-part label set. According to the present invention, an interactive display would be provided on a display monitor of a plurality of independently interactive panels, wherein each panel corresponds to a particular label on a multi-part label set.

The exemplary embodiment of the present invention described herein illustrates the features of the present invention with respect to one type of VBI, namely postage stamps. However, it will be understood by someone with ordinary skill in the art that the present invention is not limited to generic postage stamps. Rather, the present invention may be applied to other types of generic VBI, such as, but not limited to coupons, tickets, gift certificates, currency, money orders, vouchers and the like.

Further, the exemplary embodiment of the present invention described herein illustrates the features of the present invention with respect to a user computer, such as a personal computer, laptop, PDA, handheld devices, and the like. However, the present invention is not limited to user-computer embodiments. Rather, the present invention can be applied to a variety of other contexts, including but not limited to ATMs, kiosks, postal retail centers, postage meters, and the like.

Further, the exemplary embodiment of the present invention is sometimes described herein with reference to a multi-part label sheet. The present invention is not limited to single-feed sheets of labels, but applies multi-part label sets, including but not limited to label rolls.

The exemplary user interface of the present invention would recognize a user-specified grouping input, including but not limited to user-highlighting (as with point-click-drag), of individual interactive label panels or groups of interactive label panels displayed on the interactive label display. The exemplary user interface of the present invention would relate the user-specified grouping input to corresponding labels on a multi-part label set. Once one or more label interactive panels are highlighted, the user interface of the present invention would then prompt and receive as input, user VBI feature specifications. In the case of postage VBI, the user VBI specification input would include postage price, mail class, graphical background images, color, and other postage features; the user interface would then apply, or instruct a server-based system to apply, the user-supplied postage feature specifications to the postage labels that correspond in position on the multi-part label set to the user-highlighted interactive user interface display label panel locations.

The present invention further provides as a user-changeable default "memory" function that remembers for the last multi-part label set of stamps printed, the remaining unused labels. The present invention displays the remembered status of each label on the last multi-part label set. The user can reset the memory for a new set.

The present invention further provides a vertically-oriented generic VBI label, and systems and methods for creating such labels, such that the generic VBI label has a height and a width wherein the height is greater than the width. In the exemplary vertically-oriented generic VBI label, a machine-readable data symbologie such as a two-dimensional ("2-D") barcode or matrix code is printed below visual human-readable data. References herein to barcodes and matrix codes are illustrative references to machine-readable data symbologies. USPS cancellation of vertically-oriented generic postage stamps will be less likely to over-write the machine-readable two-dimensional ("2-D") barcode than USPS cancellation of horizontally-oriented generic postage stamps.

BRIEF DESCRIPTION OF THE DRAWINGS

These and other features, aspects, and advantages of the present invention will become better understood with regard to the following description, appended claims, and accompanying drawings where:

DETAILED DESCRIPTION

An exemplary embodiment of the present invention enables generic Value Bearing Item (VBI) systems to print generic VBI indicia, such as generic postage indicia. Generic VBI indicia includes generic postage indicia and other value bearing item indicia. Generic postage stamps may be mailed on any current or future date, to any recipient.

Software-based, on-line postage systems are now well-known in the art. An example software-based, on-line postage system is described in U.S. patent application Ser. No. 09/163,993 filed on Sep. 29, 1998, entitled "On Line Postage System", the contents of which are hereby incorporated by reference for all purposes as if fully set forth herein. As therein disclosed, an exemplary on-line postage system software comprises user code, or client software, that resides on each client system accessing an on-line postage enabled server system; controller code resides on the on-line postage enabled server system. An exemplary on-line postage system may comprise a user/client system electronically connected to a server system, which in turn is connected to a USPS system. The server system is preferably capable of communicating with one or more client systems simultaneously.

In order to print VBI indicia, such as postage stamps, using an exemplary software-based on-line VBI indicia system, a user first registers (a one-time event) with the system; in the case of postage, the user obtains a license from the USPS to print postage. In operation, a licensed and registered client of the on-line postage system sends a request for authorization to print a desired amount of postage. A postal security device (PSD) server determines whether the client's account balance is sufficient to cover the requested amount of postage, and if so, communicates an authorization to the client system. The client system then sends image information for printing postal indicium for the granted amount to a printer so that the postal indicium is printed on the print media, such as for example a label. Once the postage information is printed on an individual label it may be subsequently placed on an individual mail piece with a recipient of the users choosing and mailed and processed by the USPS.

In one embodiment, the PSD server provides an ascending register ("AR") that records the amount of postage that is dispensed or printed on each transaction and a descending register ("DR") that records the value or amount of postage that may be dispensed and decreases from an original or charged amount as postage is printed. An exemplary PSD may further include a device ID, indicia key certificate serial number, licensing ZIP code, key token for the indicia signing key, date and time of last transaction, a last challenge received from the client, an operational state of the PSD, expiration dates for keys, a passphrase repetition list and the like.

Figure 1:
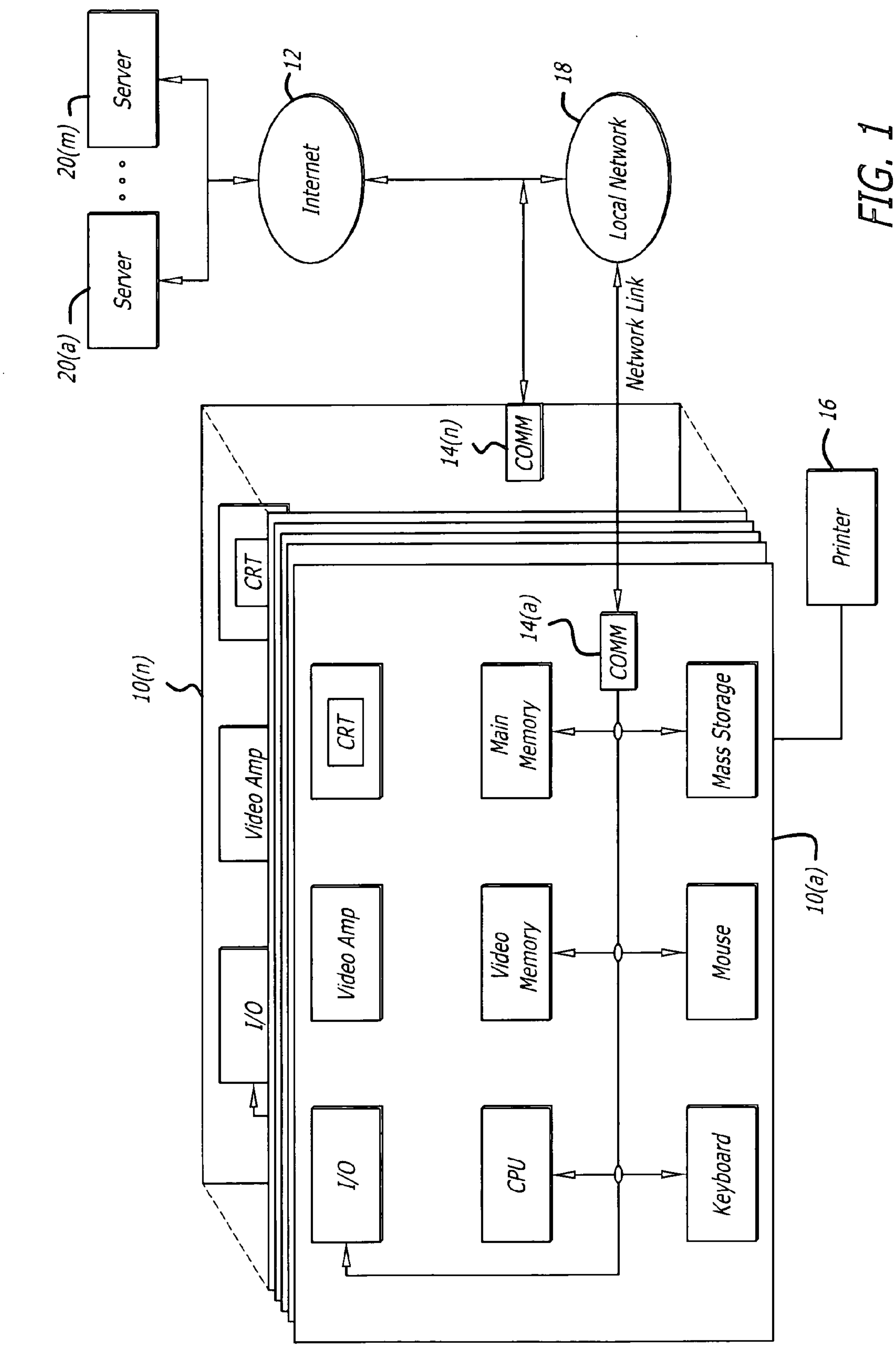
FIG. 1 is a block diagram depicting an exemplary Internet client/server environment used by an exemplary on-line postage system embodiment of the Generic VBI Invention.

FIG. 1 is a block diagram depicting an exemplary client/server environment used by an exemplary web-enabled generic postage system embodiment of the Generic VBI Invention. Clients 10*a*-10*n* and servers 20*a*-20*m* engage in two-way communication over a suitable communication network 12. In one embodiment, communication network 12 comprises the Internet. It will be understood by those skilled in the art that the communication network may take many different forms, such as a local area network (LAN), wide area network (WAN), wired telephone network, wireless network, or any other network that supports data communication between respective entities.

The clients 10*a*-10*n* may take many different forms, and in one illustrative embodiment comprise personal computers and printer, with the personal computers being linked to a PSD. Alternatively, the clients 10*a*-10*n* may comprise computers or any other device that has processing capabilities and that may engage in communication over communication network 12. Clients 10*a*-10*n* may be connected to the communication network 12 through communication links 14*a*-14*n*. In addition, each client preferably has access to a printer such as printer 16. Optionally, a local network 18 may serve as the connection between some of the clients, such as the PC 10*a* and the Internet 12. Servers 20*a*-20*m* are also connected to the Internet 12 through respective communication links.

Figure 2:
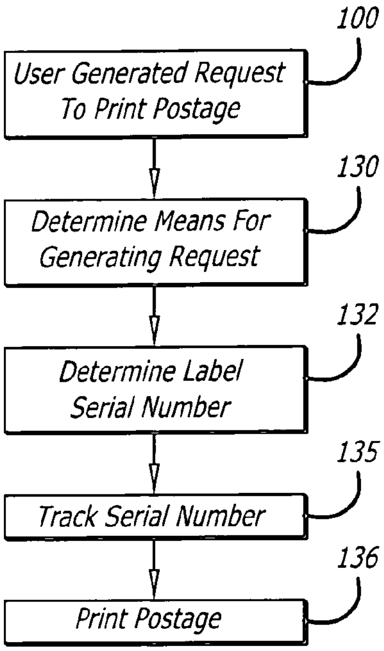
FIG. 2 is a flow chart of the operation of an exemplary system for generating generic postage in accordance with an exemplary embodiment of the Generic VBI Invention.
Figure 3:
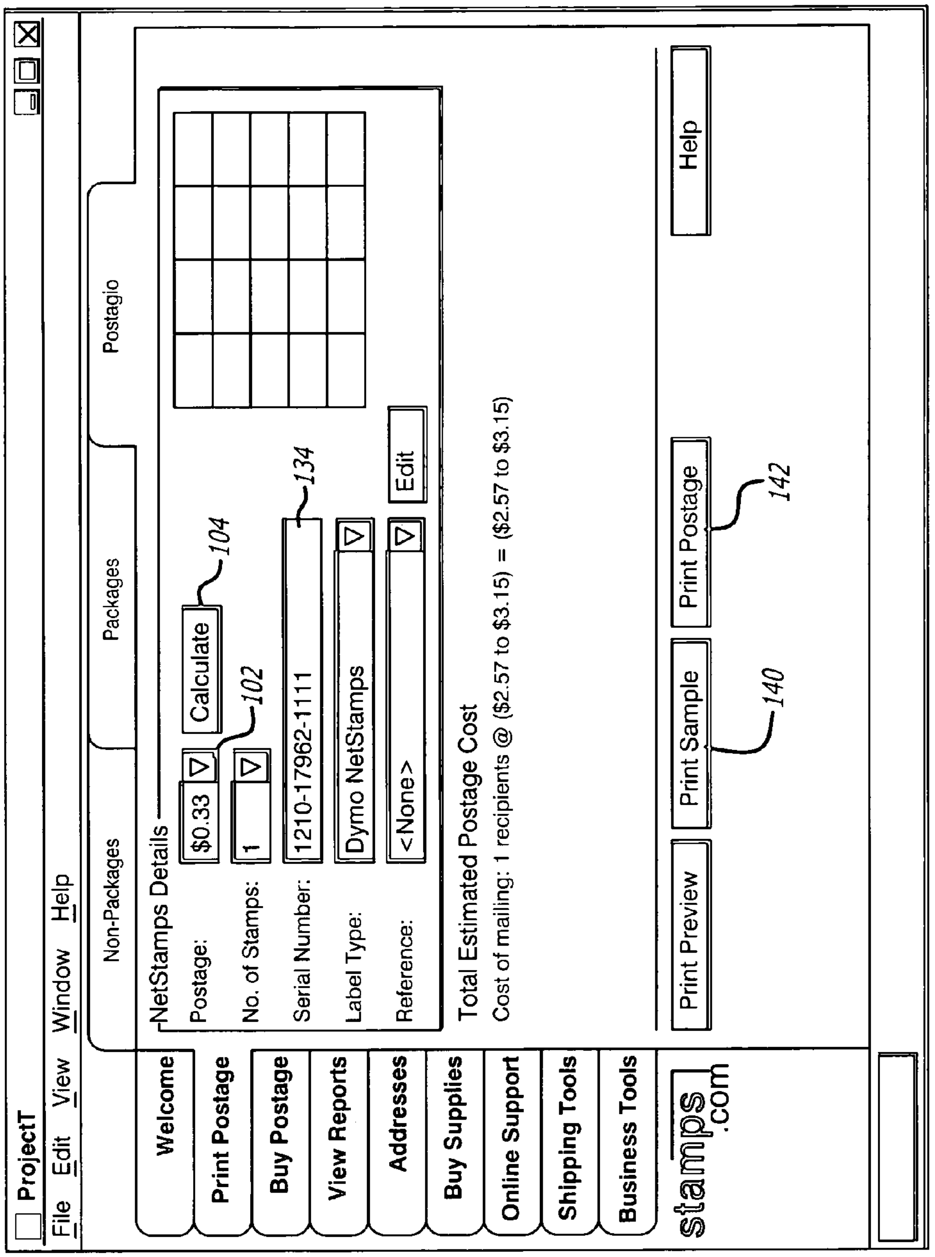
FIG. 3 is a graphic representation depicting a screen shot of an exemplary user interface to allow a user to enter postage information in a free format accordance with an exemplary embodiment of the Generic VBI Invention.

FIG. 2 is a high-level flow diagram depicting high-level functions of an exemplary generic postage system for printing generic postage stamps. As depicted in FIG. 2, a user first enters 100 a request to print the desired postage. Conventional non-PC postage stamps correspond to a particular postage class, for example, first class; there are special stamps available that are designed especially for priority and express mail services. As used herein, the terms “postage class”, “postage rate class” and “mail class” are equivalent. An exemplary generic postage system provides a user interface comprising a plurality of user interface input screens via which a user may specify and print generic postage stamps for use with one of a plurality of postage classes, including standard first class service as well as other specialty services. For example, an exemplary user interface input screen as shown in FIG. 3, provides wizard-based prompts to assist users in determining the type/class of postage to print. In addition, a second interface is provided that allows customers to simply enter the postage rate and print generic postage stamps.

An exemplary user interface includes an input window 102 into which a user may enter postage information, such as for example, an amount, such as $0.33 for first class stamps, in a free form. The user interface also includes a link 104 to a postage calculator that may be used to calculate postage for specialty services such as for example, Express mail.

Figure 4:
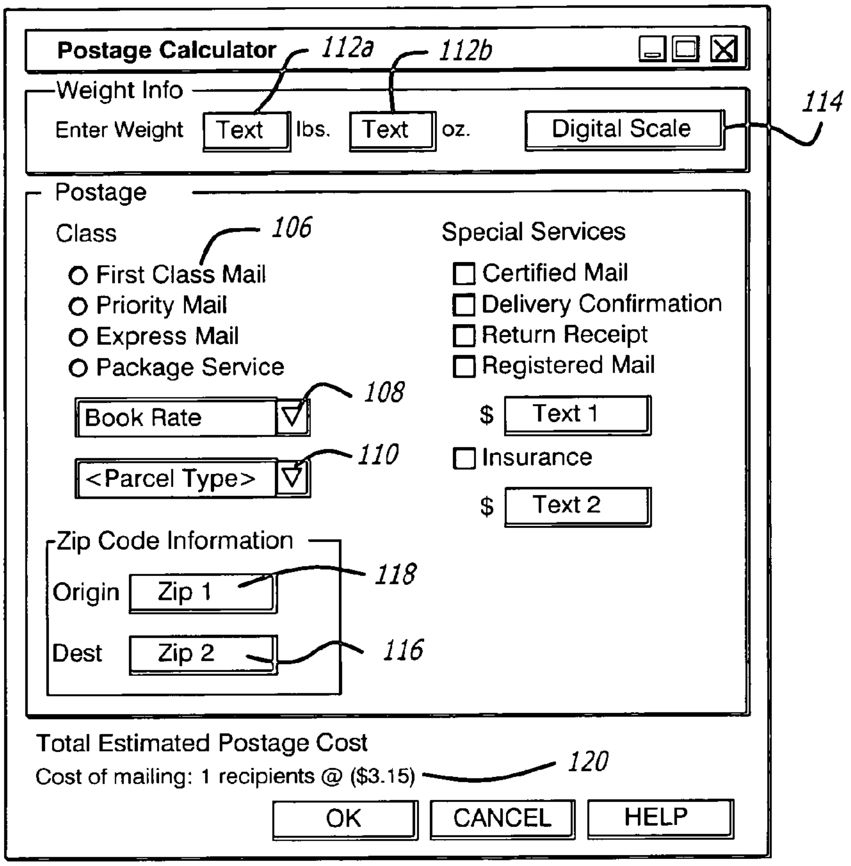
FIG. 4 is a graphic representation depicting a screen shot of an exemplar postage calculator interface to allow a user to calculate the postage for a particular mail piece in accordance with an exemplary embodiment of the Generic VBI Invention.

An exemplary postage calculator user interface screen, as shown in FIG. 4, includes a plurality of toggle buttons 106, or other input features, that allow a user to select a mail class or specialty service for which postage is being printed. In addition, the calculator includes a drop down box, or other selection feature, that allows a user to select a book rate 108 or the type 110 of mail piece to be sent, such as for example, a letter, flat, box or oversized box.

As depicted in FIG. 4, the exemplary postage calculator allows a user to enter the weight of an item to be mailed into weight fields 112*a*, 112*b*. The dimensions of the weight fields may be for example pounds 112*a* and ounces 112*b*. As will be understood by someone with ordinary skill in the art, weight dimensions may be expressed in other terms, such as, for example, kilograms and grams, without departing from the spirit of the invention.

As depicted in FIG. 4, the exemplary on-line postage system provides a scale button 114 that allows users to integrate a digital scale into the postage system. A pressing of the scale button 114 on the print postage screen allows for the automatic retrieval of a weight of a mail piece from the scale. The system displays the retrieved weight in the weight fields 112*a*, 112*b*. A default weight used by the exemplary embodiment is 0 lbs., 1 oz. In the exemplary embodiment, after an initial use by a user, the fields remember the last value.

An exemplary postage calculator further provides input windows 116 and 118 in which a user may enter the destination 116 and origin 118 zip or other postal codes respectively. The destination 116 and origin 118 zip or other postal codes are active after a weight that warrants zone-based postage has been entered. A cost-of-mailing dialog box 120 displays the total estimated postage; when multiple recipients are selected, the number of recipients is reflected.

Referring again to FIG. 2, in the described exemplary embodiment, the indicia generation process determines 130 whether a print wizard was used to generate the request to print generic postage stamps. If the print wizard was used to generate the request, the class selected within the wizard will be the class included in the generic postage stamps. If the wizard was not used, the rate class will default to first class. In an exemplary embodiment of the Generic VBI Invention, a user may select any denomination of postage desired, up to the maximum limit defined by the PCIBI-O, that is currently $999.99.

The exemplary system utilizes special paper label stock to protect against the fraudulent production of generic postage stamps. Such special paper label stock may be available through a generic VBI service provider, through retail outlets or other sources. In one embodiment of label stock in accordance with the Generic VBI Invention, multiple labels are placed on a single large set (sheet or roll) of label stock. The multiple labels may be arranged in any fashion. In one embodiment of a label sheet in accordance with the Generic VBI Invention, the labels are arranged in a rectilinear grid pattern. In another embodiment of label stock in accordance with the Generic VBI Invention, multiple labels are arranged in a linear fashion placed on a roll of label stock.

In accordance with an exemplary embodiment of the Generic VBI Invention a serial number uniquely identifies a label used to generate a postage stamp. Such a label is herein termed a Postagio label. An exemplary system may determine 132 (FIG. 2) the label serial number by way of the master serial number entered by a user in a window 134 (see FIG. 3) of the indicia print interface. The master serial number is a manufacturer serial number that is used to track the production, distribution, and use of a particular unit of label stock. An exemplary system preferably prints generic postage stamps having a serial number (e.g., 212 on FIG. 6) that matches a pre-printed serial number (e.g., 208 on FIG. 6) on a Postagio label. As an added security measure, the pre-printed serial number (e.g., 208 on FIG. 6) on the Postagio label will be based on the master serial number for label stock. In one embodiment of a pre-printed serial number in accordance with the Generic VBI Invention, the master serial number is included as the leading 3 digits in a pre-printed serial number (e.g., 208 on FIG. 6). This allows a customer to reuse a partial sheet of label stock, reducing waste while maintaining the secure nature of the paper.

Figure 6:
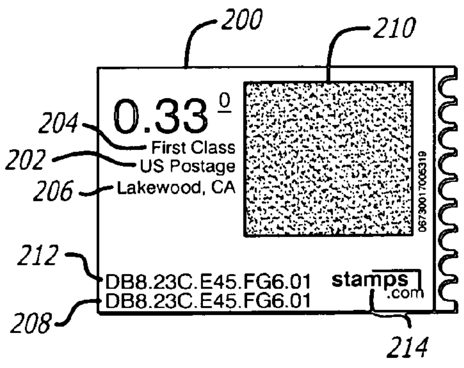
FIG. 6 is a plan view of a generic postage stamp in accordance with an exemplary embodiment of the Generic VBI Invention.

The exemplary embodiment of the Generic VBI Invention uses alphanumeric serial numbers, generated from a 28-character set. The alphanumeric serial numbers will be broken up visually for the customer to reduce data entry errors. The master serial number will contain a checksum value and will help prevent incorrect sheet values. As depicted in FIG. 6, when a user prints a generic postage stamp, the exemplary system prints a serial number 212 as part of the indicia directly above the pre-printed serial number 208 already on the label. In the exemplary embodiment, the printed serial number 212 is the same font and size as the pre-printed number 208 on the label. Such font and size similarity between the pre-printed serial number 208 and the printed serial number 212 allows for immediate visual comparison of the numbers by USPS personnel.

In the exemplary embodiment, a special serial number, such as for example, LLL.LLL.LLL.LLL, will be reserved for use by Quality Assurance; the reserved special serial number will not be tracked or restricted from reuse in any way. Entry of the reserved special serial number value will bypass the checksum validation. If a user enters this serial number inadvertently, the indicium will be generated and their account will be debited. However, the printed serial number will not match the label serial number. USPS intervention will be required to recognize that the serial numbers do not match and determine the authenticity of the postage.

Returning to FIG. 2, in the exemplary embodiment, master serial numbers and pre-printed serial numbers are tracked 135 by the server. When a unit of label stock has been used, the server flags the meter number that used label stock. If the user prints generic postage stamps on a portion of label stock, the user will be able to print indicia on the remaining labels included in the label stock at a later time. However, only the meter that initially used the label stock will be permitted to print the remaining labels. Once all labels included in the label stock have been printed, the associated master serial number and preprinted serial numbers will be flagged and any attempts to print a label using those serial numbers will be rejected by the server. In the exemplary embodiment, all possible serial numbers will not be initially activated. Rather, only label stock and labels having serial numbers that have been produced by a manufacturer and placed into distribution will be activated and available for use. Continuing with FIG. 2, a user may print 136 postage or sample postage onto the label stock.

Figure 5:
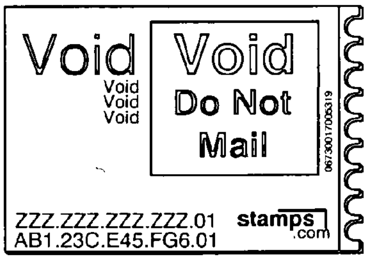
FIG. 5 is a plan view of a void generic postage stamp in accordance with an exemplary embodiment of the Generic VBI Invention.

Referring now to FIG. 3, the user may print sample postage by selecting a print sample postage radio button 140. In the exemplary embodiment, the exemplary generic VBI system generates void generic postage stamps as sample postage in response to a user selecting a print sample postage option (such as by selecting the print sample postage radio button 140). Sample postage may used, e.g., for use in printer verification tests. An example of a void generic postage stamp is shown in FIG. 5. An exemplary postage system may utilize a serial number outside the character set reserved for actual postage, such as for example, ZZZ.ZZZ.ZZZ.ZZZ.## as the serial number for void indicia.

Continuing with FIG. 3, the user may print an actual generic postage stamp by selecting a print postage radio button 142. An exemplary generic postage stamp is preferably different in appearance from conventional IBIP postage indicia. The difference in appearance of exemplary generic postage stamps as compared to conventional IBIP postage indicia is to allow USPS personnel and customers to instantly recognize and distinguish the generic postage stamps. Because generic postage is non-recipient and/or non-date specific, the exemplary embodiment provides fraud-prevention measures, including, e.g., creating a machine-readable data matrix barcode format such as, e.g., 210 in FIG. 6 that is printed as part of the Postagio indicium.

Referring now to FIG. 6, an exemplary generic postage stamp includes multiple pieces of information, some preprinted and some printed at the time of indicia creation, to ensure the uniqueness of the stamp and ease of processing. For example, an exemplary indicia includes the postage amount 200 displayed in the upper left-hand corner of the indicia. The postage amount is preferably displayed using the largest font size permitted given the size of the label and the indicium. The large font size helps ensure that USPS personnel can quickly identify the stamp value. In addition, an exemplary system preferably prints "U.S. Postage" 202 under the postage amount, preferably, in a slightly smaller font than the postage amount. The term U.S. Postage helps ensure that the stamp is identified as being domestic in origin. Further the indicia preferably identifies the mail class 204 served by the stamp and may include relevant information regarding the stamps origination such as for example the LPO 206 or Licensing Post Office.

A generic postage stamp may further include a pre-printed serial number 208. The pre-printed serial number is a unique number printed on the bottom left-hand corner of the label to identify the sheet source and the individual label number. The exemplary system further includes the pre-printed serial number in the machine-readable data matrix barcode format 210 to ensure that the stamp is unique and for USPS authentication. In addition, a serial number will also be printed 212 at the time the Postagio is created. This will be printed directly above the pre-printed serial number as an added fraud deterrent. If the serial numbers do not match each other and the serial number in the machine-readable data matrix barcode format 210, then the generic postage is not valid.

The generic postage stamp may further include a logo 214 of the generic VBI provider. The logo 214 may be pre-printed on the label. In one embodiment the label stock preferably features a logo 214 that is the provider logo as a means to guarantee that the label stock meets the necessary security requirements. The logo 214 helps ensure that an authorized vendor designated by both the service provider and the USPS created the label. In addition, the logo 214 will help the USPS to quickly identify the product that created the Postagio.

In the exemplary embodiment, the labels may further include various additional anti-fraud features to guard against the fraudulent production of generic postage stamps. For example, the label stock preferably uses phosphorescent ink. Phosphorescent ink is considered a specialized material that is not readily available to the general public, thereby ensuring the security of the label stock. In one embodiment, each Postagio label is coated with a phosphorescent ink. The phosphorescence will also assist the USPS automated handling equipment in identifying the stamp. In addition, the generic postage stamps will preferably be cut with a special die to further ensure the security of the Postagio labels. In one embodiment of a special die in accordance with the Generic VBI Invention, the cutting edges of the die do not follow a straight line. Instead the cutting edges are composed of a sequence of specially angled lines.

The label stock may further include watermark printing in the form of a printed background graphic (preferably in that range of about 10-20% color saturation). The watermark printing is visible to the eye and not easily reproduced. The watermark in one embodiment is represented by a flag emblem, as shown in the sample indicia illustrated in FIG. 5.

The Postagio label stock may further include micro-printing that is invisible to the naked-eye, but can be seen under a microscope. The micro-printing provides an additional security measure, since it cannot be easily reproduced. In a preferred embodiment the micro-printing is limited to the space to the left of the indicium. The micro-printing preferably reads "US Mail/The name of the service provider".

Further, the previously described pre-printed serial number may be imprinted on the Postagio label stock with thermally sensitive color-changing ink, known as thermochromatic ink. The serial number uniquely identifies the Postagio label. In one embodiment, the serial number on the label must match the number printed by the service provider as well as the number in the machine-readable data matrix barcode format (210 in FIG. 6). The color-changing ink ensures that a designated vendor created the Postagio label.

The Postagio label stock preferably does not use optical brightening agents, to prevent a reaction under black light. In addition, different color paper may be offered, possibly including white, ivory, blue, pink, peach, and gray. All paper will be tested to ensure compliance with the anti-fluorescent requirements and to ensure that the indicia is still easily scanable. Colors will preferably have a maximum saturation in a range of about 10-30% saturation. In addition, the label design preferably accounts for print engine tolerance in placement of specific elements.

Figure 7:
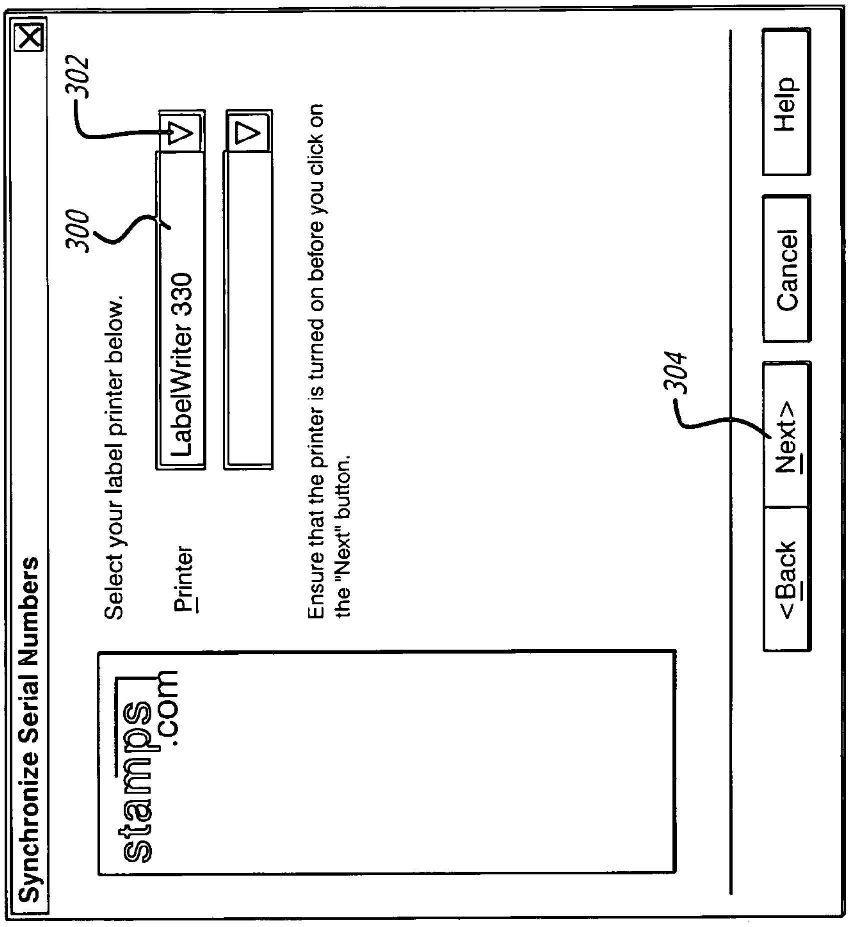
FIG. 7 is a graphic representation depicting a screen shot of an exemplary user interface to allow a user to enter the serial number of a label sheet or roll of labels in accordance with an exemplary embodiment of the Generic VBI Invention.
Figure 8:
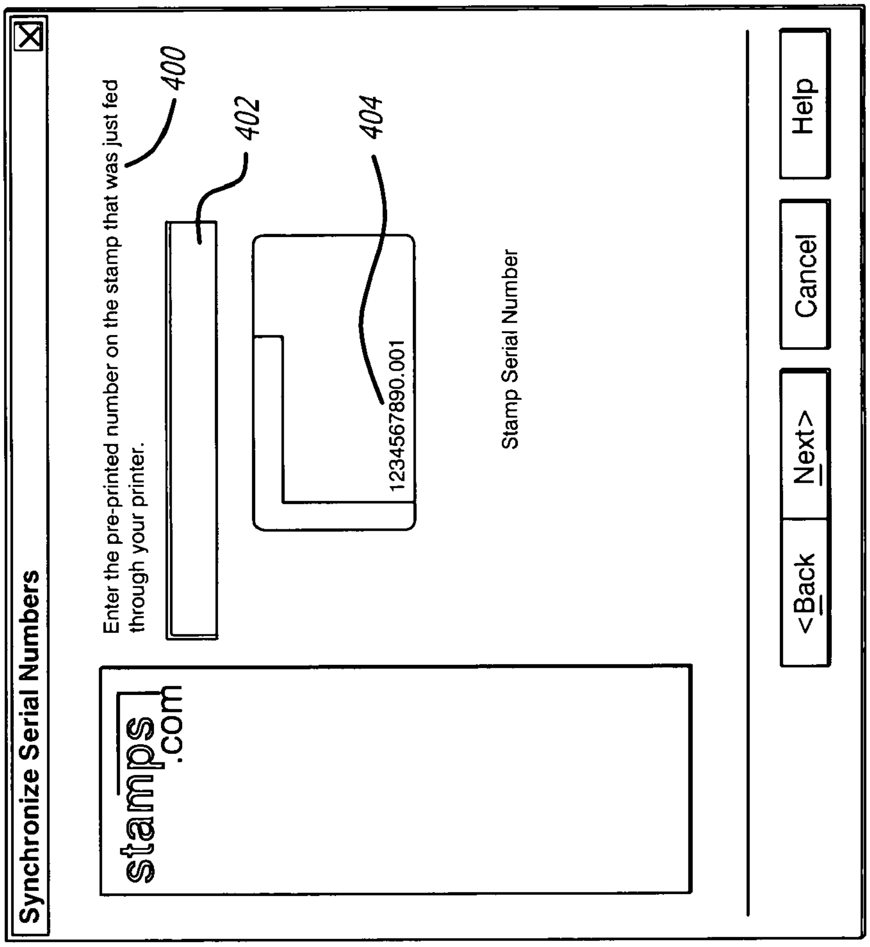
FIG. 8 is a graphic representation depicting a screen shot of an exemplary user interface to allow a user to enter a master serial number of sheet label stock or roll label stock in accordance with an exemplary embodiment of the Generic VBI Invention.

FIG. 7 and FIG. 8 are graphic representations depicting screen shots of exemplary user interfaces for allowing a user to enter the master serial number of a sheet or roll of label stock in accordance with an exemplary system for generating generic postage in accordance with the Generic VBI Invention. FIG. 7 is a graphic representation of a screen shot of an exemplary user interface to allow a user to enter a printer type in accordance with an exemplary embodiment of the Generic VBI Invention. The exemplary system will determine, according to the printer type indicated, whether sheet label stock or roll label stock is being used.

Continuing with FIG. 7, a user uses the printer type field 300 to enter an identification of a printer type used to print postage. The user selects the printer type button 302 in response to which the exemplary system generates a printer type menu, such as a drop-down menu (not shown) with selectable names of supported printer types. In operation, the user selects a printer type from the printer type menu. The printer type menu collapses and the printer type selected by the user is shown in the printer type field 300. Once entered, the printer type is retained in the particular client for future reference. The user selects a "next" button 304 to advance to the next serial number entry user interface screen. In the case where the user selects a printer type indicating that roll label stock is being used, a blank stamp is issued from the printer 16 (FIG. 1) when the "next" button 304 (FIG. 7) is selected. The user may then reference the issued blank stamp for subsequent data entry tasks.

FIG. 8 is a graphic representation depicting a screen shot of an exemplary user interface for user entry of the serial number of sheet label stock or roll label stock in accordance with an exemplary embodiment of the Generic VBI Invention. In the case that a printer type using roll label stock was selected by the user in the previous user interface screen (FIG. 7), the serial number input user interface (FIG. 8) includes an instruction message 400 telling the user to examine the blank stamp to be used. The blank stamp includes a pre-printed serial number from which the master serial number for the entire roll of label stock may be determined. The pre-printed serial also includes a label sequence number 404 that identifies the label's sequence in the roll of label stock. The user reads the pre-printed serial number 404 from the stamp and enters the serial number into the serial number entry field 402.

In the case where the user is using label stock in sheet form, the user simply reads a pre-printed serial number from one of the labels on the sheet label stock. The exemplary system for generating generic postage uses the entered serial number for subsequently printing postage as previously described. In an embodiment of an exemplary system for generating generic postage in accordance with the Generic VBI Invention, the entered serial number is validated by checking the pre-printed serial number against a database of valid pre-printed serial numbers and also by checking the type of the label stock associated with the pre-printed serial number.

Figure 9:
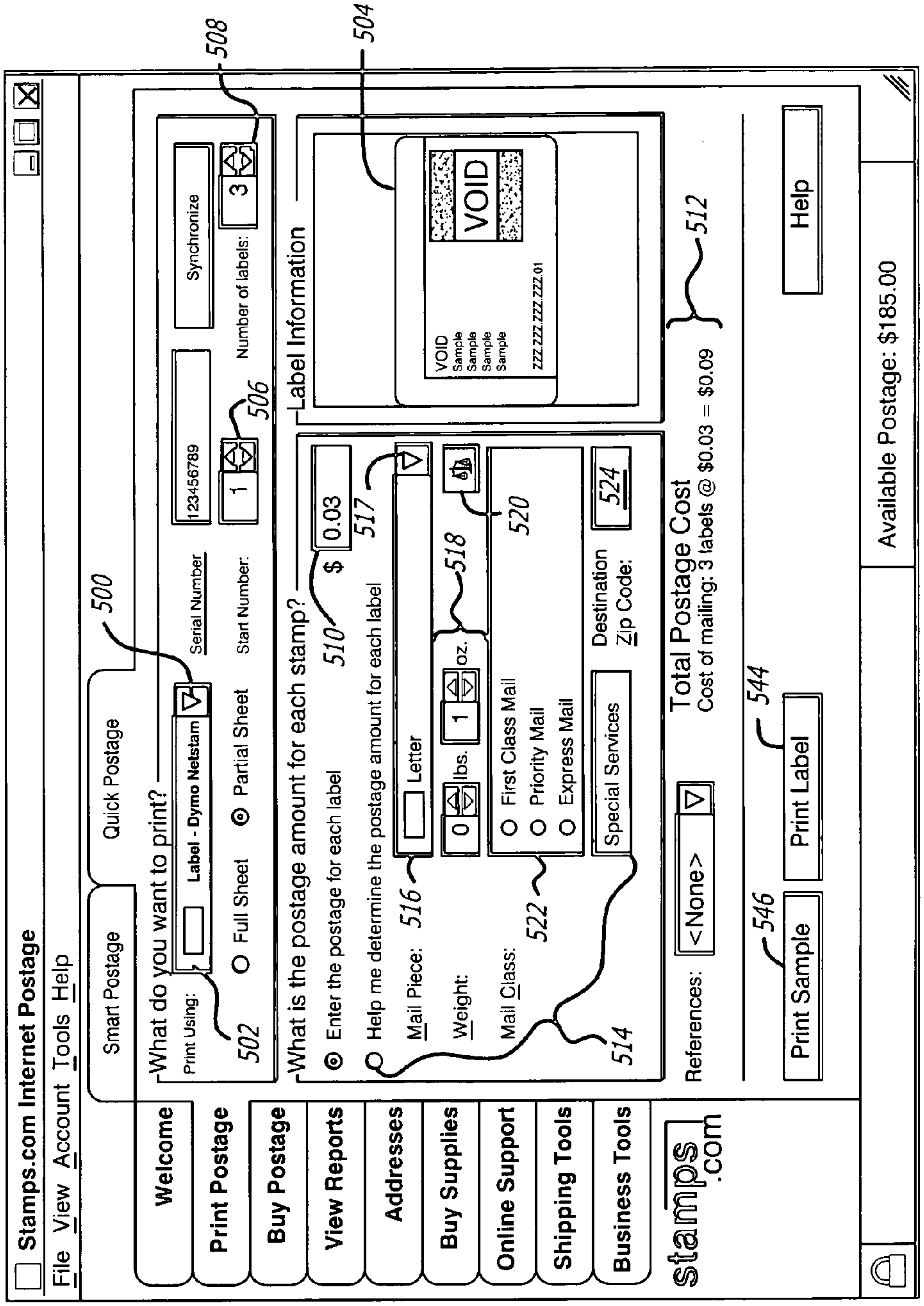
FIG. 9 is a graphic representation depicting a screen shot of an exemplary user interface to allow a user to quickly print postage using roll label stock in accordance with an exemplary embodiment of the Generic VBI Invention.

FIG. 9 is a graphic representation depicting a screen shot of an exemplary user interface to allow a user to quickly print postage using a roll of label stock in accordance with an exemplary embodiment of the Generic VBI Invention. A user selects a printer type selection button 502 to generate and display a printer type menu (not shown). The printer type menu includes a list of selectable printer types. The user selects a printer type from the menu and the printer type menu collapses. The selected printer type determines the label stock type as shown in label stock type field 502. Additionally, an exemplary label preview 504 is displayed within the user interface confirming the user's choice of label stock. The user enters a start number in a start number entry field 506 and a number of labels to print in a number of labels entry field 508. The user enters an amount of postage to print on each label in a postage amount entry field 510. The total amount of postage to be printed is calculated and displayed in a total postage cost field 512.

If the user does not know how much postage is needed, the user may use a postage calculator 514 included in the user interface to calculate the correct amount of postage. To use the postage calculator, the user selects a mail piece type using the mail piece type entry field 516. The user then enters the weight of the mail piece using weight entry field 518. In one embodiment of an exemplary system for generating generic postage, the user can select a scale button 520 to automatically enter the weight of a mail piece as the mail piece is weighed on a digital scale. The user selects the mail class of the mail piece using a mail class entry field 522. Finally, the user enters a ZIP code to which the mail piece is being sent in a ZIP code entry field 524. Once all of the previously described information is entered, a postage amount is calculated and displayed in the previously described total postage cost field 512. To print generic postage, the user selects a print labels button 544. Alternatively, the user can print a voided sample label by selecting a print sample button 546.

Figure 10:
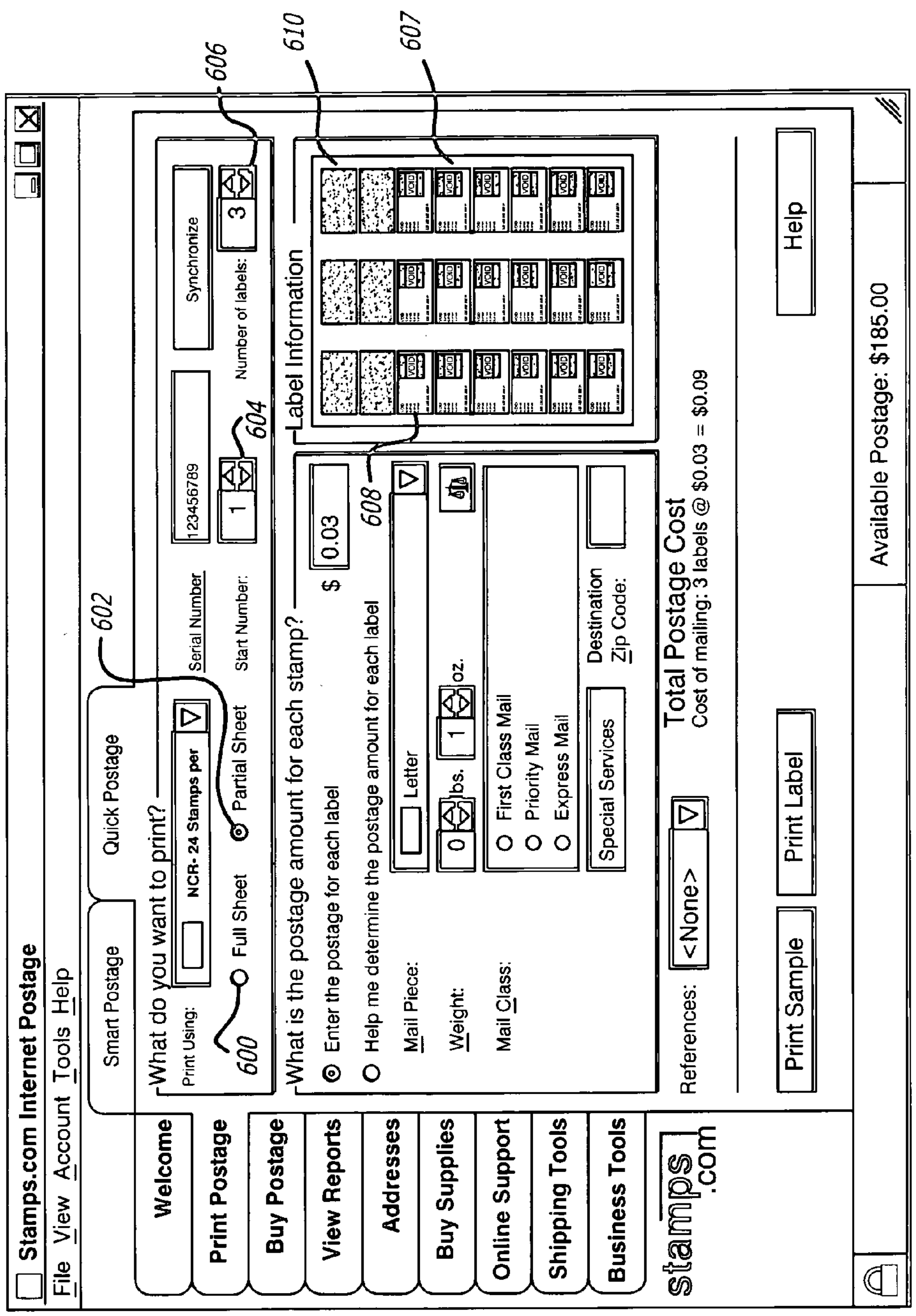
FIG. 10 is a graphic representation depicting a screen shot of an exemplary user interface to allow a user to quickly print postage using sheet label stock in accordance with an exemplary embodiment of the Generic VBI Invention.

FIG. 10 is a graphic representation of a screen shot of an exemplary user interface to allow a user to quickly print postage using a sheet of label stock in accordance with an exemplary embodiment of the Generic VBI Invention. The operation of this user interface is similar to the previously described roll label stock interface, except that, if a user selects a printer type using sheet label stock instead of roll label stock, two additional buttons, a full sheet button 600 and a partial sheet button 602, are made available to the user. A user selects a full sheet button 600 to print postage onto a full sheet of labels. Or, the user may select a partial sheet button 602 to print postage on a partial sheet of labels. In this case, the user enters a starting number for the labels in a start number entry field 604 and a number of labels to print in a number of labels field 606. When the user selects the partial sheet button 602 and enters a start number in the start number entry field 604, a sheet label stock display 607 is generated showing labels that will be printed. The sequence numbers 608 of the printable labels on the sheet label stock are shown in the sheet label stock display. Those labels that will not be printed are shown as blank labels 610.

The present invention shares the features of the Generic Postage Stamp Invention as described above.

The generic postage user interface of the Generic VBI Invention does not provide for user-varied postage specifications for individual labels on a multi-part label set. Rather, the Generic VBI Invention provides for a single set of postage specifications for a particular print command; although the user can specify the start location and number of stamps to printed, the user cannot change the specification for individual stamps during a single print instruction. Using the generic postage user interface of the Generic VBI Invention, a user who wants to print different postage amounts or specify different mail classes on various labels on a multi-part label set would need to print each set of specifications separately, each time, re-feeding the multi-part label set through the user's printer.

Figure 11:
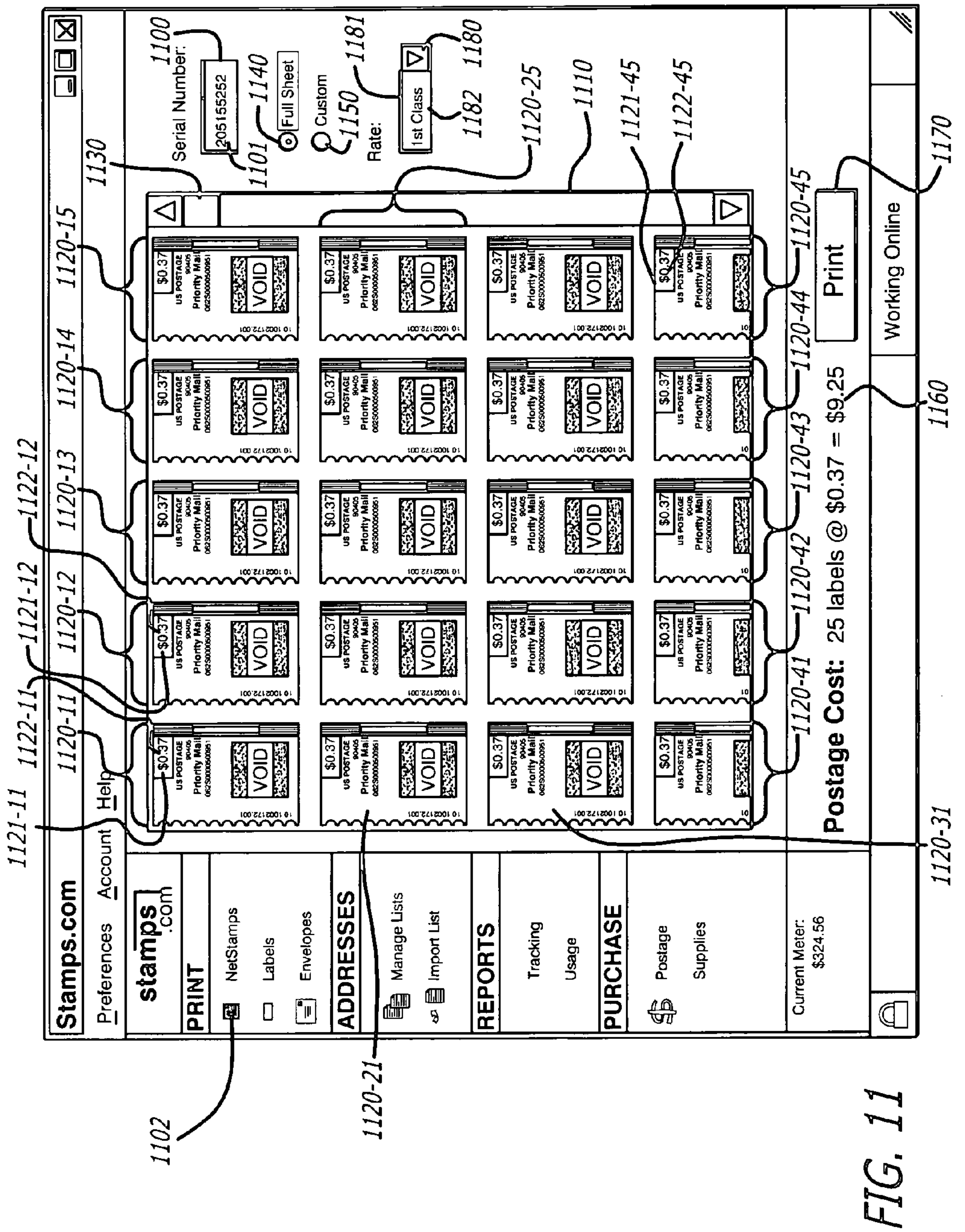
FIG. 11 is a graphic representation of an exemplary WYSIWYG generic stamp specification interface of the present invention.

In contrast to the single-set-of-specifications-per-print user interface of the Generic VBI Invention as depicted in FIG. 10, the present invention also provides an intuitively-based (WYSIWYG) user interface for generic VBI indicia custom specification of each label on a multi-part label set. FIG. 11 is a graphic representation of an exemplary WYSIWYG generic VBI stamp indicia specification interface of the present invention. As depicted in FIG. 11, the user can input a Serial No. 1101 into a Serial No. input field 1100. In the exemplary embodiment of the WYSIWYG generic stamp specification interface, the user can select an option 1102 for printing generic stamps. In the exemplary embodiment of the present invention, the client side user interface responds to the user selection of the generic stamp option 1102 by generating and displaying on the user's display monitor an interactive display 1110 of generic postage stamps.

Figure 12:
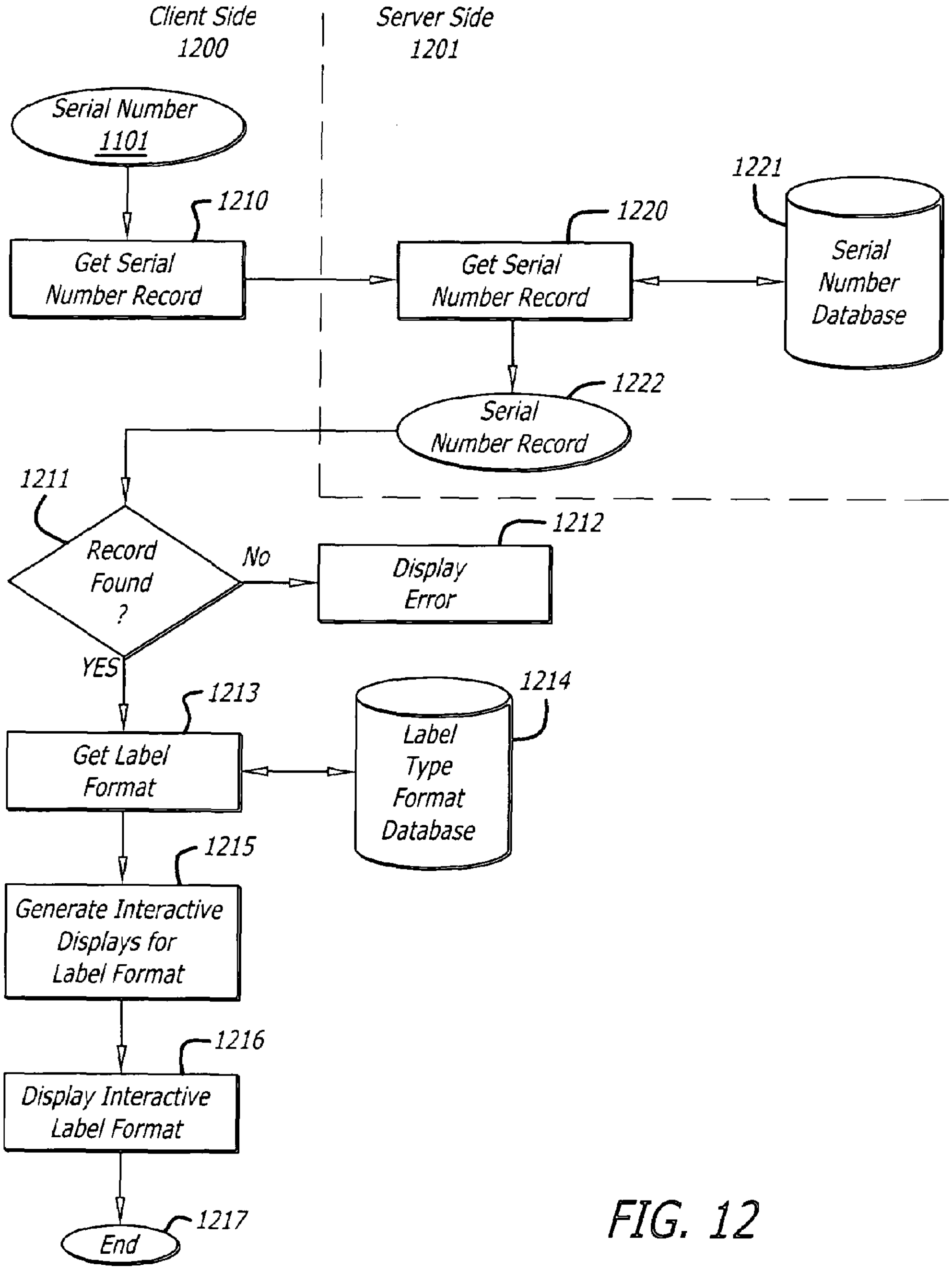
FIG. 12 is a high level flow diagram depicting high level functionality of an alternative exemplary client side WYSIWYG interface 1200 of the present invention and certain interactive functions with the alternative exemplary server side 1201 of the present invention.

FIG. 12 is a high level flow diagram depicting high level functionality of an alternative exemplary client side WYSIWYG interface 1200 of the present invention and certain interactive functions with the alternative exemplary server side 1201 of the present invention. It will be understood by someone with ordinary skill in the art that the depiction of particular functions being performed on the client side, or the server side, of the alternative exemplary embodiment of the present invention is illustrative; further alternative structures for function performance are possible without departing from the spirit of the present invention.

As depicted in FIG. 12, the alternative exemplary client side WYSIWYG user interface 1200 receives the user input Serial No. 1101. In response to receiving the user input Serial No. 1101, the alternative exemplary client side WYSIWYG user interface 1200 then instructs the server system to query the database of valid pre-printed serial numbers using the user input Serial No. 1101 as a key and get a record 1210 of information associated with the Serial No. 1101.

In response to the instructions from the client side 1200, the server side 1201 of the system reads the Serial No. Database 1221. If the server side 1201 of the system finds a match of the input Serial No. 1101 on the Serial No. Database 1221, the server side 1201 of the system returns the record 1222 of information from the Serial No. Database 1221 associated with the Serial No. 1101 to the client side 1200 WYSIWYG user interface. Serial No. Database record 1222 information includes, among other things, a label type.

The client side 1200 tests 1211 to see if any record is found. If no record is found, then the client side 1200 displays 1212 an instructive error message to the user's display monitor. If the Server Side 1201 returns a record 1222, then the client side 1200 uses the label type from the returned Serial No. Record 1222 to select 1213 from a Label Type Database 1214 a label type format corresponding to the returned label type.

The client side 1200 then generates 1215 an interactive display of the returned label format and displays 1216 the interactive label display to the user's display monitor, ending 1217 the initial display function of the alternative exemplary client side WYSIWYG user interface 1200.

Returning to FIG. 11, an exemplary interactive label display 1110 is depicted. As depicted in FIG. 11, the exemplary interactive label display 1110 provides a plurality of separate, independently interactive label panels, e.g., 1120-11 through 1120-45. A scroll button 1130 is provided so that the user can scroll down the interactive label display 1110.

In the exemplary WYSIWYG generic stamp specification interface depicted in FIG. 11, a "Full Sheet" option 1140 has been selected by the user. In response to the user selecting the "Full Sheet" option 1140, the exemplary WYSIWYG generic stamp specification interface depicted in FIG. 11 displays each separate, independently interactive label panel, e.g., 1120-11, to include a rate input field, e.g., 1121-11. The user can input any amount, e.g., $0.37 (e.g., 1122-11) (up to the maximum limit defined by the PCIBI-O, which is currently $999.99), in any rate input field 1121-11 through 1121-45. Once the user inputs a postage rate class amount, e.g., $0.37 (e.g., 1122-11) in any rate input field 1121 -11 through 112145, the amount is displayed in each rate input field 1121 -11 through 1121-45 in each separately interactive label panel, e.g., 1120-11 through 1120-45 of the interactive label display 1110.

The interface provides a rate menu button 1180 for a pop-up (or other type of menu, such as a drop down) menu (not shown) of postage rate classes from which the user can select a postage rate class, e.g., $1^{st}$ Class 1182. Once the user selects a postage rate class 1182, the selected rate class is displayed in a rate class display field 1181 and is applied to each separately interactive label panel, e.g., 1120-11 through 1120-45, in the interactive label display 1110.

Figure 13:
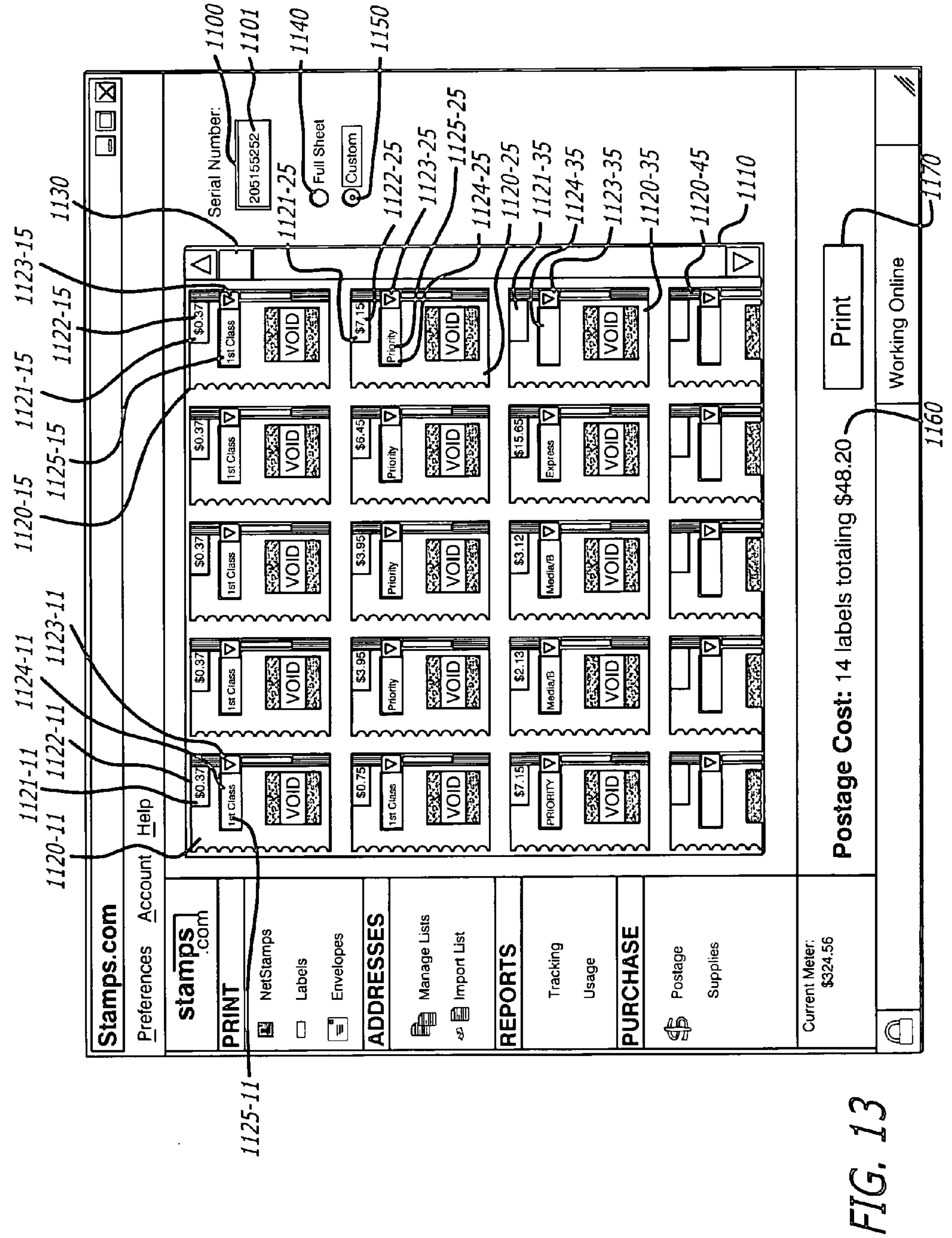
FIG. 13 is a graphic representation of an exemplary WYSIWYG generic VBI stamp custom specification interface of the present invention in which a "Custom" option has been selected by the user.

FIG. 13 is a graphic representation of an exemplary WYSIWYG generic VBI stamp custom specification interface of the present invention in which a "Custom" option 1150 has been selected by the user. In response to the user selecting the "Custom" option 1150, according to the present invention, an interactive display would be provided on a client display monitor of a plurality of independently interactive panels, wherein each panel corresponds to a particular label on a multi-part label set.

As depicted in FIG. 13, the exemplary WYSIWYG generic stamp custom specification interface of the present invention displays a further enhanced interactive label display 1110 in which each separate label panel, e.g., 1120-11 through 1120-45, displays an independent postage rate class input field, e.g., 1125-11 with a postage rate class menu button, e.g., 1123-11. Once the user has selected the "Custom" option 1150, the user can set the price for each label by clicking on the individual rate input field, e.g., 1121-11 of the particular label panel, e.g., 1120-11, and inputting any amount, e.g., $0.37 (e.g., 1122-11); and then clicking on the corresponding postage rate class menu button, e.g., 1123-11 and selecting a postage rate class, e.g., 1125-11. The system calculates the total for all postage input by the user and displays the total number of stamps and the total amount of the postage specified 1160. As depicted in FIG. 13, unused label panels, such as panel 1120-35, do not have values for postage 1121-35 or rate class 1124-35 and will be available for future use. That is, the user does not need to print all of the stamps available on the set. When the user is satisfied with the custom postage stamp specifications, the user can click on a Print button 1170 to cause the system to print the stamps.

In an alternative exemplary embodiment, the user interface would provide an input selection with which the user could choose from a plurality of graphic sets, a graphic element and/or background for each generic VBI, such as a graphic background for a generic postage stamp.

Figure 17:
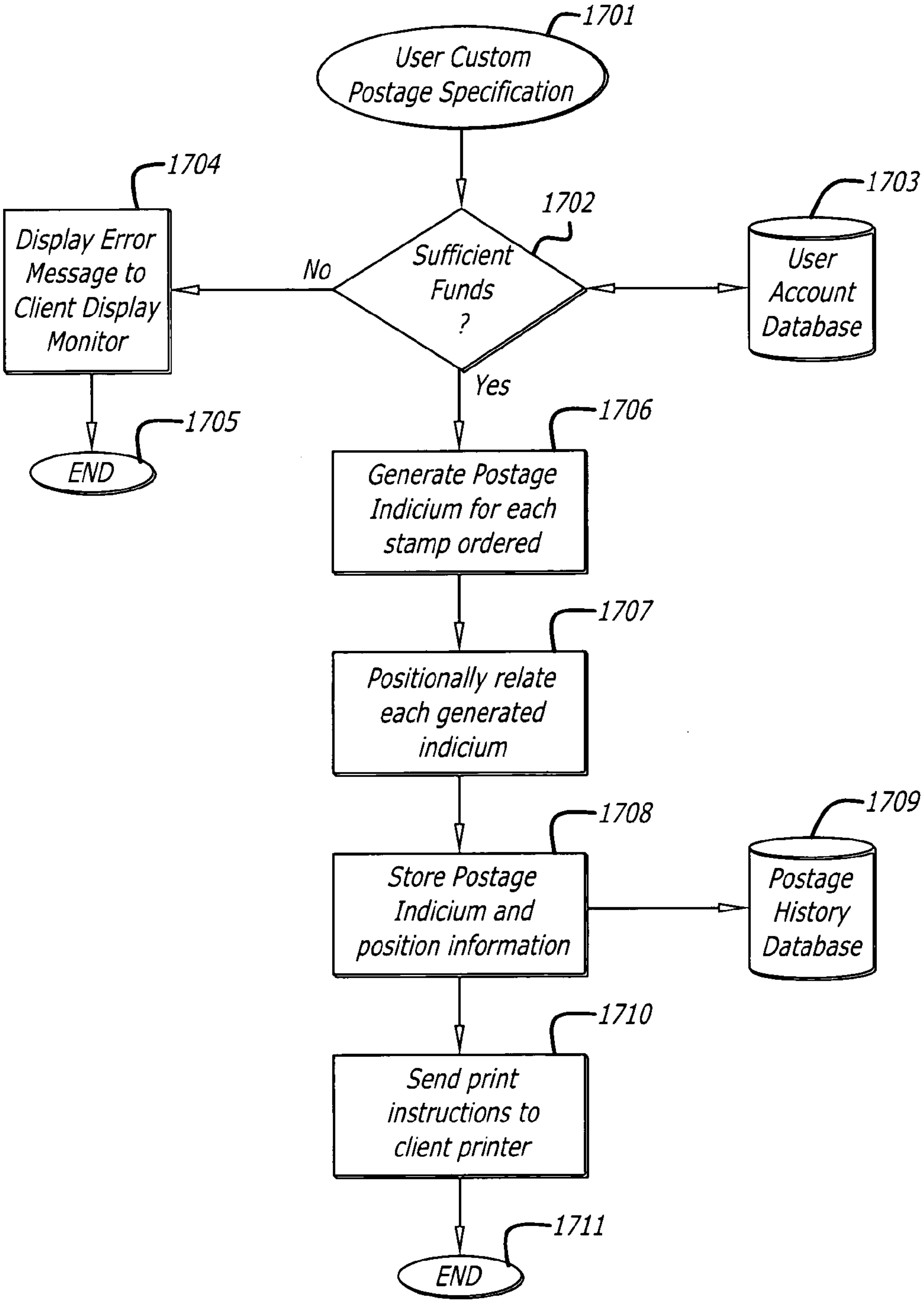
FIG. 17 is a high level flow diagram depicting exemplary high level custom stamp order processing functions of an exemplary embodiment of the present invention.

FIG. 17 is a high level flow diagram depicting exemplary high level custom stamp order processing functions of an exemplary embodiment of the present invention. As depicted in FIG. 17, in response to the user clicking the Print button 1170 (FIG. 13), the system of the present invention would receive as an interaction from the user's computer a plurality of sets of user input postage stamp specifications 1701—each set of user input postage stamp specifications corresponding to a particular label on a multi-part label set. In response to the receipt of the plurality of sets of user input postage stamp specifications, the system would verify 1702 that the requesting user has sufficient funds to pay for the postage by accessing a user account database 1703. If the user does not have sufficient funds, the system would notify the user with an error message 1704, 1705. If the user has sufficient funds, then the system of the present invention would generate 1706 a separate set of postage indicium corresponding to each set of user input postage stamp specifications. The system of the present invention would positionally relate 1707 each generated separate set of postage indicium to a corresponding label location on the multi-part label set. The system of the present invention would store 1708 the postage indicium and the corresponding label location for each stamp to be printed in a postage history database 1709. The system would then send 1710 to the user's client printer device instructions for printing each generated postage indicium according to the stored positional location for the particular stamps to be printed in order to end 1711 the system's response to the user's input.

Returning to FIG. 13, when the "Custom" option 1150 has been selected, the exemplary user interface of the present invention would recognize a user-specified grouping input, including but not limited to user-highlighting (as with point-click-drag), of individual interactive label panels or groups of interactive label panels displayed on the interactive label display 1110. For example, the user could point and click on interactive label panel 1120-11, and then drag the cursor to highlight all of the interactive label panels in the top row 1120-11 through 1120-15 of the interactive label display 1110. In response to the user's point-click-and-drag, the system of the present invention would highlight all of the interactive label panels in the top row 1120-11 through 1120-15 of the interactive label display 1110. If the user then inputs a price, e.g., $0.37 (e.g., 1122-11) in the individual rate input field, e.g., 1121-11 of the particular label panel of any particular label panel, e.g., 1120-11, within the highlighted panels, and then clicks on the corresponding postage rate class menu button, e.g., 1123-11 and selects a postage rate class 1125-11, the exemplary user interface of the present invention would relate the user specifications input to each label panel in the highlighted group 1120-11 through 1120-15 and would display the entered postage amount and postage rate class in each of the postage amount fields 1121-11 though 1121-15 and each of the postage rate fields 1125-11 through 1125-15 in each label panel in the highlighted group 1120-11 through 1120-15.

In an alternative exemplary embodiment, once one or more label interactive panels are highlighted, the user interface of the present invention would then prompt and receive as input to interactive input fields, user postage feature specifications, including postage price, mail class, graphical background images, color, and other postage features; the user interface would then apply, or instruct a server-based system to apply, the user-supplied postage feature specifications to the postage labels that correspond in position on the multi-part label set to the user-highlighted interactive user interface display label panel locations.

Figure 14:
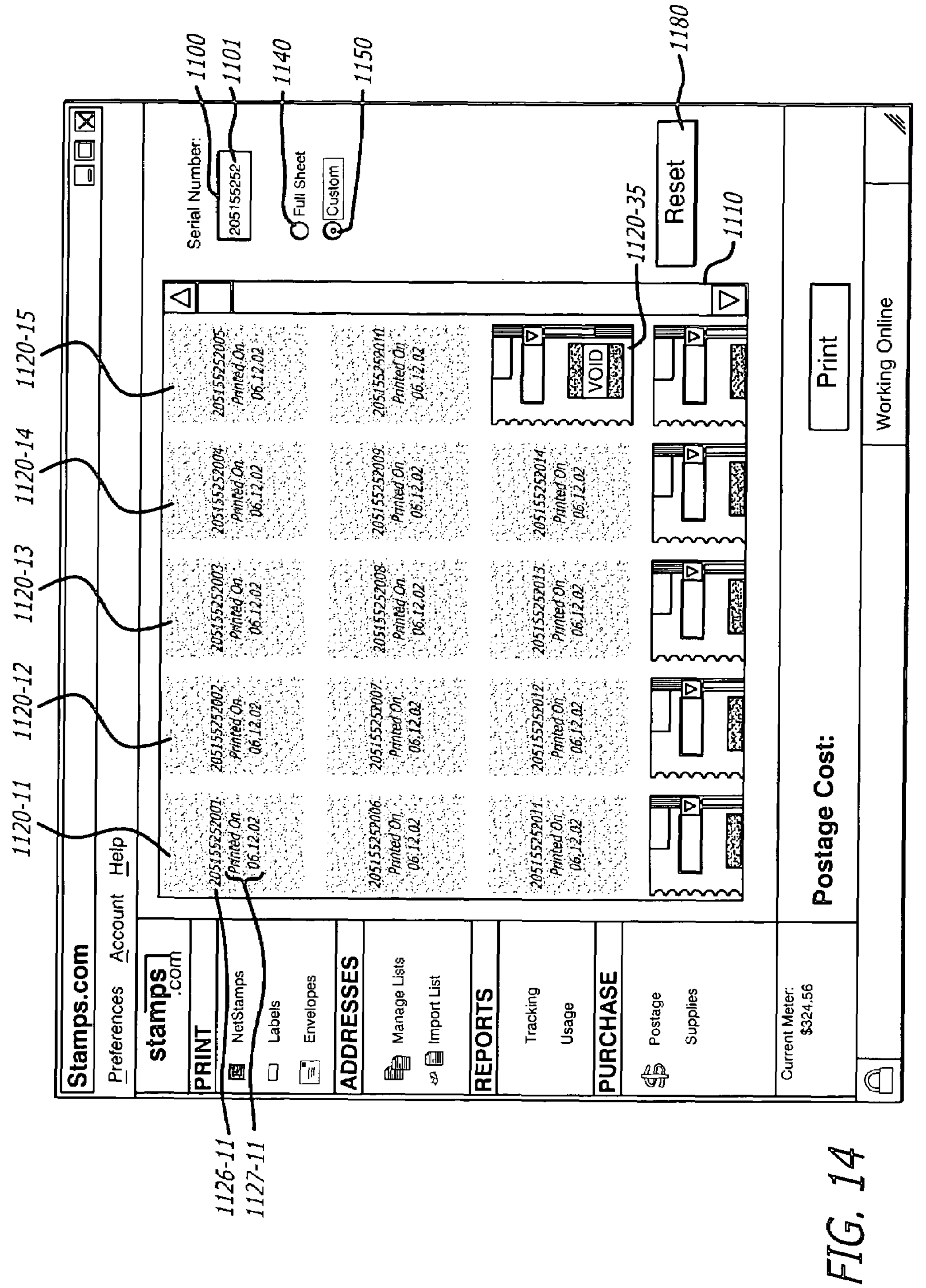
FIG. 14 is a graphic representation of an exemplary WYSIWYG generic VBI stamp custom specification interface of the present invention in which a "Custom" option has been selected by the user at a point in time after a subset of labels on the last multi-part label sheet have been printed.

The present invention further provides a user-changeable default "memory" function that remembers for the last multi-part label set of stamps printed, the remaining unused postage labels. The present invention displays as a visual history the remembered status of each label on the last multi-part label set. FIG. 14 is a graphic representation of an exemplary WYSIWYG generic stamp custom specification interface of the present invention in which a "Custom" option 1150 has been selected by the user at a point in time after a subset of labels on the last set of labels has been printed. As depicted in FIG. 14, interactive label panels corresponding to stamps that have been printed, e.g. 1120-11 through 1120-15, are displayed as empty labels with an information note comprising a Serial No., e.g. 1126-11, and a date on which the corresponding stamp was printed, e.g., 1127-11. Interactive label panels, e.g., 1120-35, for which a corresponding label has not yet been printed, are displayed as available. If the user wants to use a new set of labels instead of using the last-used partial set, the user can reset the memory for a new set by clicking on the Reset button 1180.

As is depicted in FIG. 6, the Generic VBI Invention disclosed the generation and printing of a horizontally-oriented generic VBI postage stamp label such that a machine-readable two-dimensional ("2-D") barcode 210 is printed side-by-side with human-readable postage indicia, e.g., 200, 202, 204, and 206.

In contrast to the horizontally-oriented generic postage stamp disclosed by the Generic VBI Invention, the present invention further provides a vertically-oriented generic VBI indicia label, and systems and methods for creating such labels. In the exemplary embodiment, a machine-readable two-dimensional ("2-D") Data Matrix barcode including VBI indicia is printed below human-readable data; a space is provided above the barcode of sufficient size to receive a USPS cancellation stamp.

Matrix codes are 2-D codes that code data based on the position of black spots within a matrix. Each black dot element is the same dimension; the position of each black dot element codes the data. A Data Matrix 2-D matrix code can store between one and 500 characters. The symbol is also scalable between a 1-mil square to a 14-inch square. The information in a Data Matrix code is represented by an absolute dot position rather relative dot position. The Data Matrix coding scheme has a high level of redundancy with the data "scattered" throughout the symbol. This scattering and redundancy allows the Data Matrix symbol to be read correctly even if part of it is missing. It will be understood by someone with ordinary skill in the art that the use in the exemplary embodiment of a Data Matrix code is illustrative and is not a limitation of the invention.

Figure 15A:
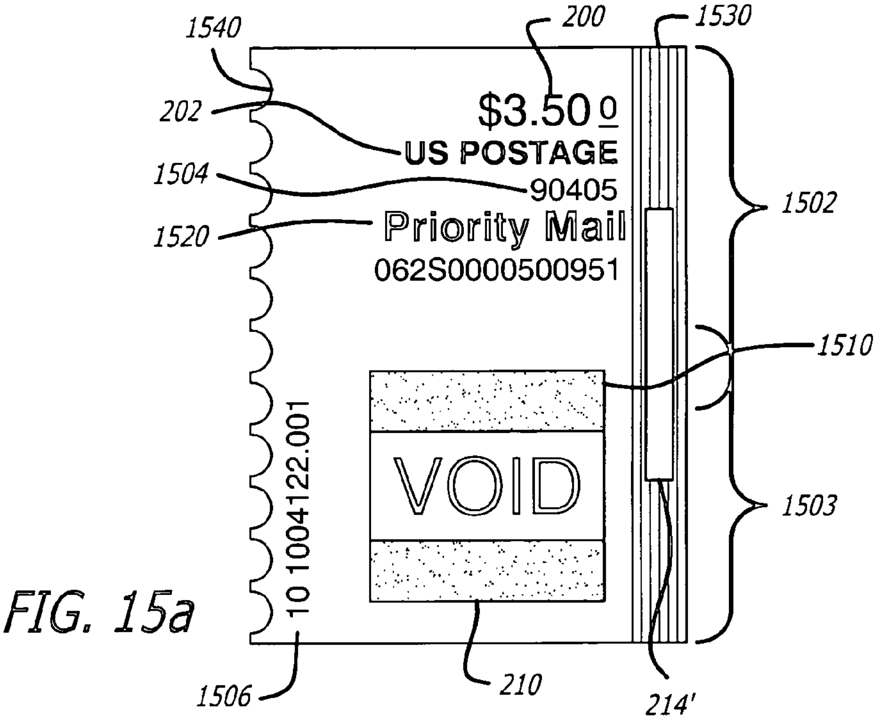
FIG. 15*a* is a graphic representation of an exemplary vertically-oriented generic postage stamp of the present invention.

FIG. 15*a* is a graphic representation of an exemplary vertically-oriented generic postage stamp of the present invention. In contrast to the horizontally-oriented generic postage stamp depicted in FIG. 6, the vertically-oriented generic postage stamp depicted in FIG. 15*a* has a height and a width wherein the height is greater than the width. The exemplary vertically-oriented generic postage stamp of the present invention is 1.75 inches in height and 1.3 inches in width. The vertically-oriented generic postage stamp depicted in FIG. 15*a* provides a top portion 1502. The top portion 1502 is of a size to accommodate a USPS cancellation stamp; the USPS cancellation stamp may overlap a small portion 1510 (see FIG. 15*b*) of a bottom portion 1503. The top portion 1502 in FIG. 15*a* displays human-readable postage indicia, including a postage amount 200, the words "U.S. POSTAGE" 202, a originating address zip code 1504, a mail class 1520, and a device identifier 1505 (comprising a PSD Manufacturer ID, a PSD Model ID, and a PSD Serial No.). In the exemplary vertically-oriented generic postage stamp of the present invention, a tolerance zone of 0.0625 inches is provided surrounding the human readable printed indicia.

Below the top portion 1502 is the bottom portion 1503 in which machine-readable VBI indicia, such as a two-dimensional ("2-D") barcode 210' and a Serial No. 1506 are printed. A fluorescent facing 1530 is provided. A logo 214' is provided in a vertical portrait orientation in white ink in a portion of the fluorescent facing 1530. The Serial No. 1506 is printed in a vertical portrait orientation. An edge 1540 of the label is die-cut in a scalloped pattern.

Figure 15B:
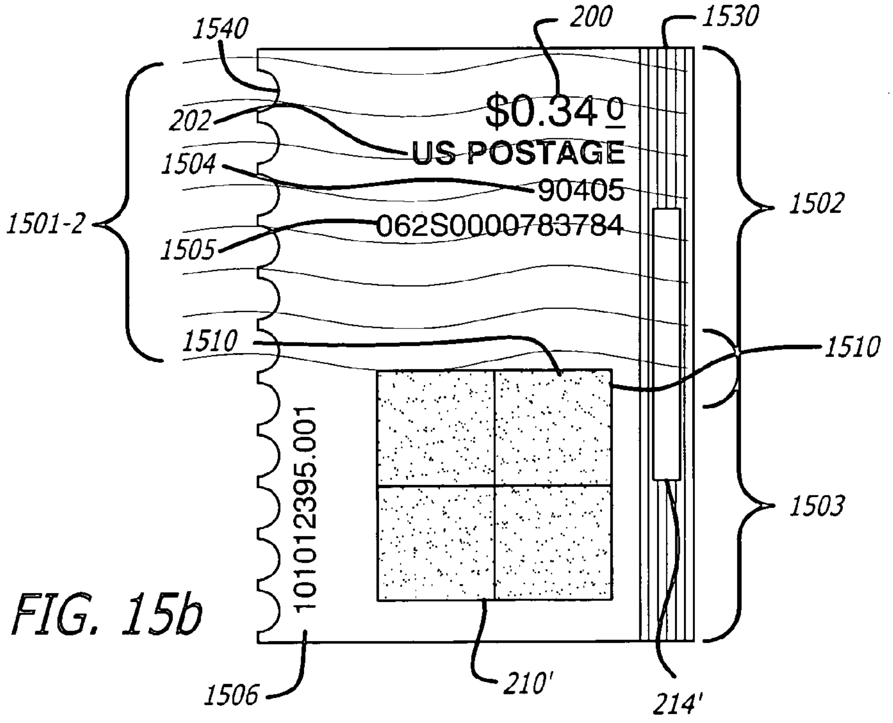
FIG. 15*b* is a graphic representation of a cancelled exemplary vertically-oriented generic postage stamp of the present invention.

FIG. 15*b* is a graphic representation of a cancelled exemplary vertically-oriented generic postage stamp of the present invention. FIG. 15*b* depicts a portion 1501-2 of a USPS cancellation stamp. As can be seen from FIG. 15*b*, in the exemplary embodiment of the present invention, the portion 1501-2 of the USPS cancellation stamp may overwrite a portion 1510 the machine-readable two-dimensional ("2-D") barcode 210'.

Figure 16:
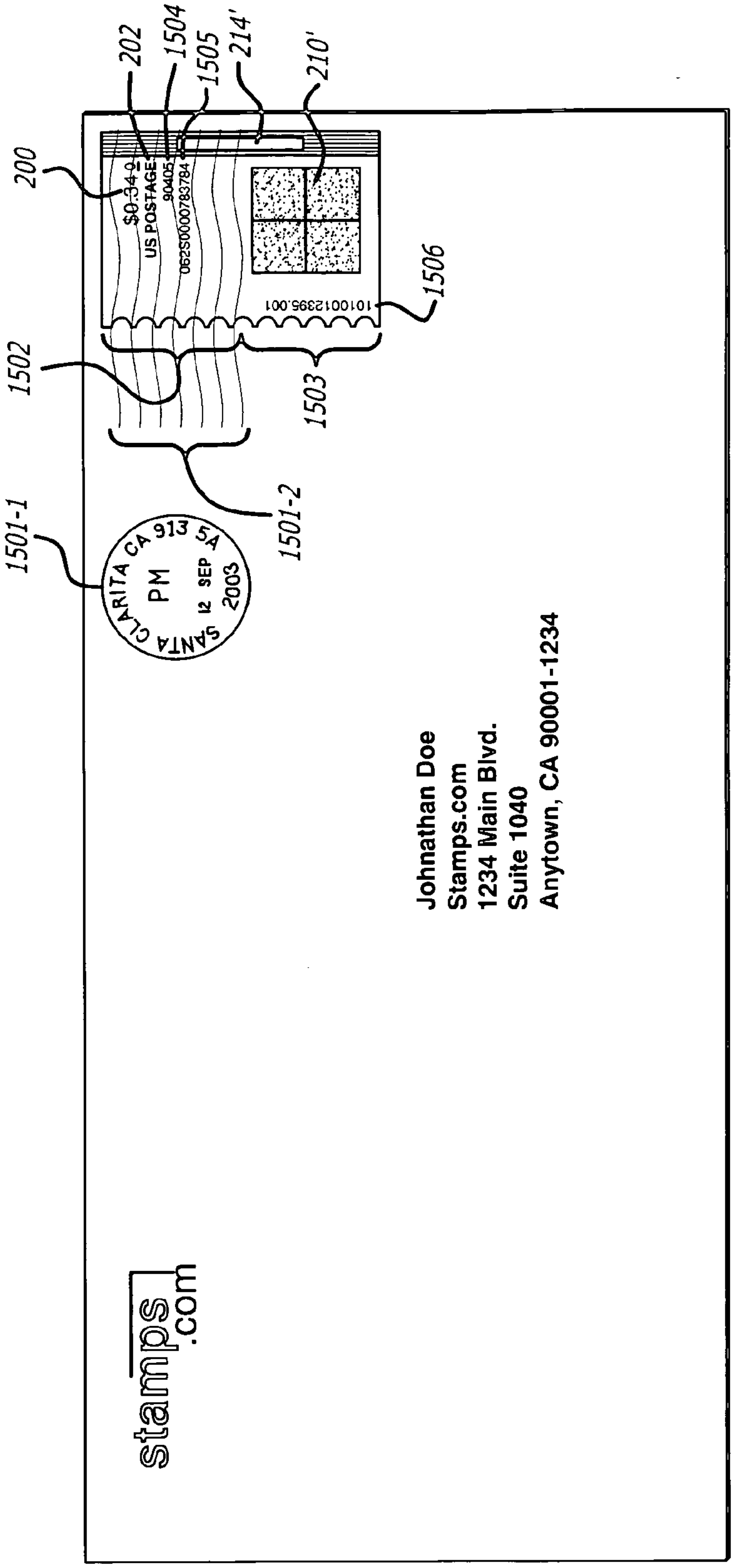
FIG. 16 is a front view of an envelope bearing a cancelled exemplary vertically-oriented generic postage stamp of the present invention.

FIG. 16 is a front view of an envelope bearing a cancelled exemplary vertically-oriented generic postage stamp of the present invention. As can be seen from FIG. 16, the USPS cancellation stamp comprising a city/date-of-mailing portion 1501-1 and a stamp cancellation 1501-2 does not overwrite the machine-readable two-dimensional ("2-D") barcode 210' in the bottom portion 1503 of the exemplary vertically-oriented generic postage stamp.

In the exemplary embodiment of the present invention, when a printed label is removed from the multi-part label set, a portion of the label (a Postage History Label), printed with the Serial No. for that label and other information, remains adhered to the set. The remaining Postage History Label can be peeled off of the set and applied to a file copy of the document mailed, or applied to some other accounting or filing record, as a record of the mailing.

Figure 18:
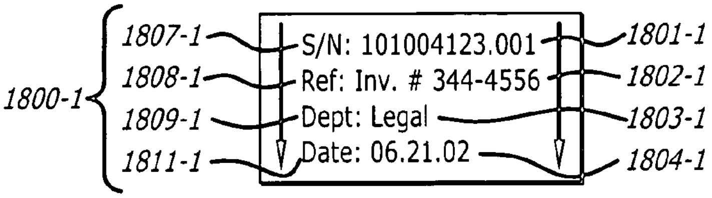
FIG. 18 is a graphic representation of an exemplary Postage History Label in an exemplary embodiment of the present invention.
Figure 19:
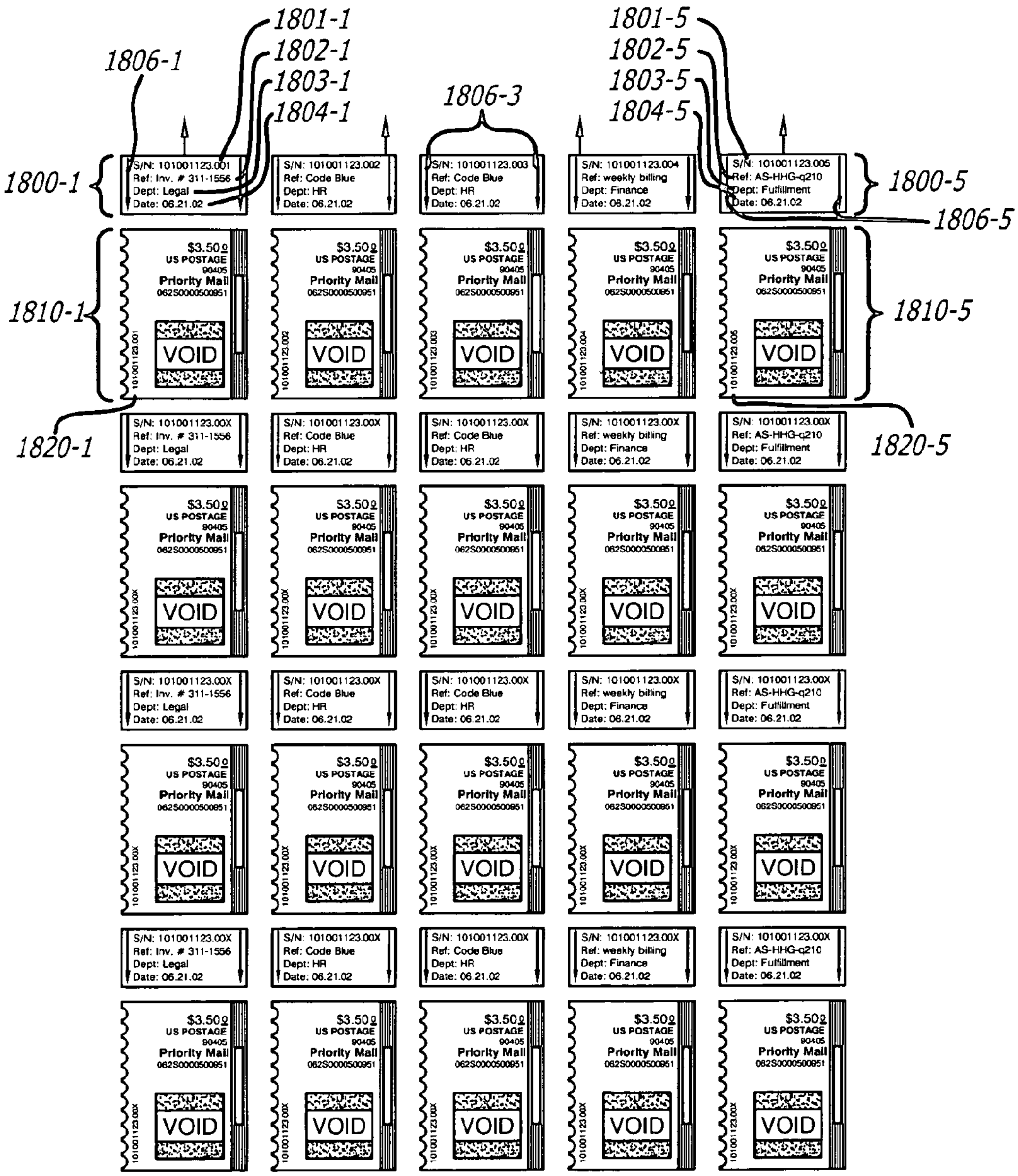
FIG. 19 is a graphic representation depicting an exemplary printed sheet of vertically-oriented stamps and corresponding Postage History Labels in an exemplary embodiment of the present invention.

FIG. 18 is a graphic representation of an exemplary Postage History Label in an exemplary embodiment of the present invention. FIG. 19 is a graphic representation depicting an exemplary printed sheet of vertically-oriented stamps and corresponding Postage History Labels in an exemplary embodiment of the present invention. As depicted in FIG. 19, in response to a user ordering postage, the exemplary system of the present invention would print a Postage History Label, e.g., 1800-1 corresponding to each printed stamp, e.g., 1810-1. As depicted in FIGS. 18 and 19, the exemplary system of the present invention would print on each particular Postage History Label e.g., 1800-1, a Serial No. 1801-1 corresponding to the Serial No. 1820-5 of the stamp 1810-1 that corresponds to the Postage History Label 1800-1 and the date 1804-1 the stamp was printed. The exemplary system of the present invention would further print additional Postage History information, which in the exemplary embodiment, would be user-defined fields, such as, for example, 1.) a Reference Number 1802-1, supplied by the user, such as for accounting purposes; and 2.) a Department Identifier 1803-1. Each exemplary Postage History Label, e.g. 1800-1, would display arrows, e.g., 1806-1 that point toward the stamps, 1810-1 that corresponds to the relevant Postage History Label 1800-1. A user-input interface would be provided with which the user would input an identification of a label for each piece (e.g., 1807-1, 1808-1, 1809-1, 181 1-1) of user-defined information to be printed on each Postage History Label. As will be understood by someone with ordinary skill in the art, the types of information described, such as Reference Number 1802-1 and Department Identifier 1803-1 are illustrative and are not a limitation of the invention.

In an alternative exemplary embodiment, the Postage History Label, or a portion of the Postage History Label, would comprise a second layer of the label on which a stamp is printed; the Ser. No. would be preprinted on the Postage History Label.

A printer database may be located on the user's computer. A server-side printer database may be located on the server-side. The server-side printer database may include a forms database (e.g., a forms.dat file) that defines the types of supported print media (e.g., envelopes, labels, postcards, generic VBI labels, and the like). It will be understood by someone with ordinary skill in the art that various manufacturers may provide generic VBI label sets according to the particular manufacturer's specifications. Each manufacturer's VBI label sets may differ from other manufacturers' generic VBI label sets in size, dimension and configuration features. The forms database will define for each print media type (including each manufacturer's generic VBI label sets) the size, dimensions and configuration of the media.

In response to a user indicating a particular media type, the present invention accesses the forms database and locates the forms database record corresponding to the user-identified media type (according to the user's particular printer device). The present invention then uses the forms database size, dimension and configuration features information to calculate a size and/or print location of the Data Matrix (or other barcode) for each particular generic stamp ordered by the user according to the media type dimensions for the selected media and according to the user's particular printer device. It will be understood by someone with ordinary skill in the art that the forms database could alternatively be accessed by the server system.

As previously mentioned above, the Data Matrix coding scheme has a high level of redundancy with the data "scattered" throughout the symbol that allows the Data Matrix symbol to be read correctly even if part of it is missing. In the exemplary embodiment of the present invention, the print size and location are calculated by the system (according to the media type specified by the user and according to the user's printer device) to allow the maximum number of generic labels on a particular sized (e.g., 8.5 inches by 11 inches) multi-part set. In order to provide the maximum number of generic labels on a set, a level of overwrite of the USPS cancellation stamp over the Data Matrix is also calculated so that the readability of the Data Matrix in the bottom portion 1503 of the vertically-oriented generic postage stamp (as depicted, e.g., in FIG. 15) is not jeopardized by the application of a USPS cancellation stamp—that is, the USPS cancellation stamp is applied to the top portion 1502 of the vertically-oriented generic postage stamp (as depicted, e.g., in FIG. 15) and overlaps a small amount 1510 of the bottom portion 1503.

Illustrative Embodiments

Although this invention has been described in certain specific exemplary embodiments, many additional modifications and variations would be apparent to those skilled in the art. For example, the present invention may be implemented by a variety of generic postage metering systems in accordance with a variety of print requirements promulgated by postal systems around the world. Further, although the operation of the present invention has been demonstrated in accordance with USPS requirements for PC based postal printing, the present invention is not limited to applications in accordance with the USPS requirements. Rather, the present invention is equally applicable for operation in all PC postal printing and VBI indicia printing systems. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A first set of printable labels disposed on a sheet of label stock for use with a printer for printing generic value-bearing item labels, the sheet of label stock comprising a top sheet edge and a right sheet edge, wherein the right sheet edge comprises a vertical sheet height, wherein the top sheet edge comprises a horizontal sheet width, wherein the vertical sheet height is greater than the horizontal sheet width, each printable label of the first set of printable labels comprising:

a left label edge and a right label edge, wherein the left label edge and the right label edge each comprise a vertical label height, wherein the printable label is arranged on the sheet so that the right label edge is substantially parallel to the right sheet edge of the sheet of label stock;

a top label edge and a bottom label edge, wherein the top label edge and the bottom label edge each comprise a horizontal label width, wherein the vertical label height is greater than the horizontal label width;

a printable area disposed within a label boundary, the label boundary comprising the left label edge, the right label edge, the top label edge and the bottom label edge;

a treated label edge selected from a group consisting of: the left label edge and the right label edge, wherein the treated label edge comprises a die-cutting along the vertical label height between the treated label edge and an adjacent portion of the sheet of label stock, wherein the adjacent portion of the sheet of label stock is disposed outside the label boundary of at least one printable label of the first set of printable labels, and wherein the treated label edge is characterized by a label edge finishing treatment selected from a group consisting of: an application of fluorescent ink along a portion of the vertical label height substantially parallel to the treated label edge, and a serration along a portion of the treated label edge;

a bottom portion of the printable area adapted for receiving machine-readable value bearing item data, wherein the bottom portion is substantially adjacent to the bottom label edge; and a top portion of the printable area adapted for receiving human-readable value bearing item data, wherein the top portion is substantially adjacent to the top label edge.

2. The set of printable labels of claim 1, wherein the top portion is sized for receiving a postage cancellation marking.

3. The set of printable labels of claim 1, wherein the treated label edge comprises an application of fluorescent ink in combination with an application of non-fluorescent ink along a portion of the treated label edge.

4. The first set of printable labels of claim 1, wherein the adjacent portion of the sheet of label stock is disposed outside the label boundary of each printable label of the first set of printable labels.

5. The first set of printable labels of claim 4, wherein the treated label edge comprises an application of fluorescent ink in combination with an application of non-fluorescent ink along a portion of the treated label edge.

6. The first set of printable labels of claim 1, wherein each printable label of the first set of printable labels on the sheet of label stock further comprises a watermark printing, wherein the watermark printing is visible to the eye.

7. The first set of printable labels of claim 1, wherein each printable label of the first set of printable labels on the sheet of label stock further comprises micro-printing that is invisible to the naked-eye.

8. The first set of printable labels of claim 1, wherein each printable label of the first set of printable labels on the sheet of label stock further comprises a pre-printed serial number comprising thermally-sensitive, color-changing ink.

9. The first set of printable labels of claim 1, each printable label of the first set of printable labels further comprising:

a first label size that is substantially the same as a first size of each other printable label of the first set of printable labels.

10. The first set of printable labels of claim 9, wherein the sheet of label stock further comprises a second set of printable labels, each printable label of the second set of printable labels comprising a second label size that is substantially the same as a second size of each other printable label of the second set of printable labels, wherein each label of the second set of printable labels corresponds to a corresponding label of the first set of printable labels, and wherein each label of the second set of printable labels is adapted for receiving an identification of information corresponding to postage printed on the corresponding label of the first set of printable labels.

* * * * *

UNITED STATES PATENT AND TRADEMARK OFFICE

CERTIFICATE OF CORRECTION

PATENT NO. : 7,577,618 B2
APPLICATION NO. : 10/197044
DATED : August 18, 2009
INVENTOR(S) : Raju et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1133 days.

Signed and Sealed this

Seventh Day of September, 2010

David J. Kappos
*Director of the United States Patent and Trademark Office*